(12) United States Patent
Zhou et al.

(10) Patent No.: US 11,503,504 B2
(45) Date of Patent: Nov. 15, 2022

(54) ELECTRONIC DEVICE, METHOD, AND MEDIUM FOR BACKHAUL NETWORK

(71) Applicants: Sony Group Corporation, Tokyo (JP); Zhengyi Zhou, Beijing (CN)

(72) Inventors: Zhengyi Zhou, Beijing (CN); Zhaocheng Wang, Beijing (CN); Ning Ge, Beijing (CN); Jianfei Cao, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 6 days.

(21) Appl. No.: 17/289,754

(22) PCT Filed: Dec. 9, 2019

(86) PCT No.: PCT/CN2019/124021
§ 371 (c)(1),
(2) Date: Apr. 29, 2021

(87) PCT Pub. No.: WO2020/119637
PCT Pub. Date: Jun. 18, 2020

(65) Prior Publication Data
US 2021/0400532 A1    Dec. 23, 2021

(30) Foreign Application Priority Data

Dec. 10, 2018 (CN) .......................... 201811502642.6

(51) Int. Cl.
*H04W 28/08* (2009.01)
*H04W 76/15* (2018.01)
*H04W 36/12* (2009.01)

(52) U.S. Cl.
CPC ... *H04W 28/0815* (2020.05); *H04W 28/0933* (2020.05); *H04W 28/0967* (2020.05); *H04W 76/15* (2018.02)

(58) Field of Classification Search
CPC .......... H04W 28/0815; H04W 28/0933; H04W 28/0967; H04W 76/11; H04W 76/15;
(Continued)

(56) References Cited

U.S. PATENT DOCUMENTS 10,206,232 B2 * 2/2019 Novlan ............... H04W 56/001
11,076,432 B2 * 7/2021 Islam ................. H04W 72/1273
(Continued)

FOREIGN PATENT DOCUMENTS

| CN | 102550098 A | 7/2012 |
|---|---|---|
| CN | 103686988 A | 3/2014 |

(Continued)

OTHER PUBLICATIONS

"3rd Generation Partnership Project; Technical Specification Group Radio Access Network; Study on Integrated Access and Backhaul; (Release 15)", 3GPP Draft; 38874-100_MCC, 3rd Generation Partnership Project (3GPP), Dec. 9, 2018 (Dec. 9, 2018), XP051552506, 111 pp.

(Continued)

*Primary Examiner* — Ahmed Elallam
(74) *Attorney, Agent, or Firm* — Xsensus LLP

(57) ABSTRACT

An electronic device for a backhaul network, wherein the backhaul network comprises a first communication apparatus connected to a core network and a plurality of second communication apparatuses performing wireless communication with the first communication apparatus, includes: processing circuitry configured to perform control to cause the first communication apparatus comprising the electronic device to: operate as a primary donor; select at least one second communication apparatus of the plurality of second communication apparatuses as a secondary donor; transmit a first indicating signal to the selected at least one second communication apparatus, the first indicating signal com- (Continued)

prising node type information indicating the secondary donor; transmit a second indicating signal to a second communication apparatus that are not selected, the second indicating signal comprising node type information indicating a member node.

20 Claims, 19 Drawing Sheets

(58) Field of Classification Search
CPC . H04W 56/001; H04W 84/047; H04W 24/02; H04B 7/2606; H04B 7/15507
See application file for complete search history.

(56) References Cited

U.S. PATENT DOCUMENTS

| | | | |
|---|---|---|---|
| 2018/0092139 | A1 | 3/2018 | Novlan et al. |
| 2018/0352524 | A1* | 12/2018 | Abedini ............... H04L 5/005 |
| 2021/0036765 | A1* | 2/2021 | Keskitalo .......... H04B 7/15542 |
| 2021/0120469 | A1* | 4/2021 | Yuan .................... H04W 36/30 |
| 2021/0195539 | A1* | 6/2021 | Sheng ................ H04L 25/0224 |
| 2021/0227435 | A1* | 7/2021 | Hsieh ................... H04W 36/08 |

FOREIGN PATENT DOCUMENTS

| | | |
|---|---|---|
| CN | 107612667 A | 1/2018 |
| CN | 107690832 A | 2/2018 |
| CN | 107852591 A | 3/2018 |
| CN | 108391470 A | 8/2018 |
| WO | 2017/171354 A1 | 10/2017 |
| WO | 2019/141356 A1 | 7/2019 |

OTHER PUBLICATIONS

ZTE: "Discussion on IAB link switch and topology adaptation", 3GPP Draft; R3-184760 Discussion on IAB Link Switch and Topology Adaptation, 3rd Generation Partnership Project (3GPP), vol. RAN WG3, No. Gothenburg, Sweden; Aug. 20, 2018-Aug. 24, 2018 Aug. 10, 2018 (Aug. 10, 2018), XP0515281, 6 pp.
International Search Report and Written Opinion dated Mar. 6, 2020, received for PCT Application PCT/CN2019/124021, Filed on Dec. 9, 2019, 10 pages including English Translation.
LG Electronics, "Discussion on Synchronization and Discovery Enhancements for UE-to-Network Relay", 3GPP TSG RAN WG1 Meeting #80bis, R1-151508, Apr. 20-24, 2015, pp. 1-3.

* cited by examiner

ELECTRONIC DEVICE, METHOD, AND MEDIUM FOR BACKHAUL NETWORK

CROSS-REFERENCE TO RELATED APPLICATIONS

The present application is based on PCT filing PCT/CN2019/124021, filed Dec. 09, 2019, which claims priority to CN 201811502642.6, filed Dec. 10, 2018, the entire contents of each are incorporated herein by reference.

TECHNICAL FIELD

The present disclosure relates to electronic devices, methods, and media for backhaul networks.

BACKGROUND

A backhaul network is responsible for connecting a core network and an access network in an overall architecture of a communication network. FIG. 1 illustrates a typical network architecture in a 4G LTE system. After a user equipment accesses to the access network, uplink and downlink data of the user equipment can interact with the core network only through the backhaul network. Therefore, the backhaul network has a very important impact on the performance of the communication network.

The backhaul network may be classified into a wired backhaul network and a wireless backhaul network according to transmission media. Conventional wired backhaul networks utilize optical fibers to construct backhaul links, where fiber backhaul links are also referred to as FTTC (Fiber To The Cell) links. A conventional wireless backhaul network uses an additional directional antenna to conduct out-of-band wireless backhaul to construct a backhaul link, which uses other frequency bands, is conducted without forming any in-band interference with access services, and is suitable for fixed-position scenes.

In 5G NR technology, since the radius of a cell is reduced, the number of small base stations has greatly increased, and the infrastructure costs caused by laying optical fibers or assembling special directional antennas are relatively large. In addition, considering the possibility of mobile deployment of small base stations, it is desirable to find a new technology related to backhaul, so that a base station can simultaneously support a backhaul link and an access link using the same frequency resources and infrastructure, thereby achieving an effect of integrating the backhaul link and the access link, that is, IAB (Integrated Access and Backhaul).

SUMMARY

The present disclosure provides one or more technical solutions to solve one or more of the above problems.

The present disclosure provides an electronic device for a backhaul network, wherein the backhaul network comprises a first communication apparatus connected to a core network and a plurality of second communication apparatuses performing wireless communication with the first communication apparatus, the electronic device comprising: processing circuitry configured to perform control to cause the first communication apparatus comprising the electronic device to: operate as a primary donor; select at least one second communication apparatus of the plurality of second communication apparatuses as a secondary donor; transmit a first indication signal to the selected at least one second communication apparatus, the first indication signal comprising node type information indicating the secondary donor; transmit a second indication signal to second communication apparatuses that are not selected, the second indication signal comprising node type information indicating a member node; wherein the primary donor establishes a direct backhaul link to the core network, the secondary donor establishes a backhaul link to the core network through the primary donor, and the member node establishes a backhaul link to the core network through the secondary donor and the primary donor.

The present disclosure provides an electronic device for a backhaul network, wherein the backhaul network comprises a first communication apparatus connected to a core network and a plurality of second communication apparatuses performing wireless communication with the first communication apparatus, the electronic device comprising: processing circuitry configured to perform control to cause a second communication apparatus of the plurality of second communication apparatuses comprising the electronic device to: receive a first indication signal from a first communication apparatus that operates as a primary donor, the first indication signal including node type information indicating a secondary donor; in response to receiving the first indication signal, operate as a secondary donor; and allow connection to a second communication apparatus of the plurality of second communication apparatuses that operates as a member node, wherein the primary donor establishes a direct backhaul link to the core network, the secondary donor establishes a backhaul link to the core network through the primary donor, and the member node establishes a backhaul link to the core network through the secondary donor and the primary donor.

The present disclosure provides an electronic device for a backhaul network, wherein the backhaul network comprises a first communication apparatus connected to a core network and a plurality of second communication apparatuses performing wireless communication with the first communication apparatus, the electronic device comprising: processing circuitry configured to perform control to cause the second communication apparatus including the electronic device to: receive a second indication signal from a first communication apparatus that operates as a primary donor, the second indication signal including node type information indicating a member node; and in response to receiving the second indication signal, operate as a member node and connect to a second communication apparatus of the plurality of second communication devices that operates as a secondary donor, wherein the primary donor establishes a direct backhaul link with the core network, the secondary donor establishes a backhaul link to the core network through the primary donor, and the member node establishes a backhaul link to the core network through the secondary donor and the primary donor.

The present disclosure provides a base station including any of the electronic devices of the present disclosure.

The present disclosure provides a method for a backhaul network, wherein the backhaul network comprises a first communication apparatus connected to a core network and a plurality of second communication apparatuses performing wireless communication with the first communication apparatus, the method comprising causing the first communication apparatus to: operate as a primary donor; select at least one second communication apparatus of the plurality of second communication apparatuses as a secondary donor; transmit a first indication signal to the selected at least one second communication apparatus, the first indication signal comprising node type information indicating the secondary donor; transmit a second indication signal to second communication apparatuses that are not selected, the second indication signal comprising node type information indicating a member node; wherein the primary donor establishes a direct backhaul link to the core network, the secondary donor establishes a backhaul link to the core network through the primary donor, and the member node establishes a backhaul link to the core network through the secondary donor and the primary donor.

The present disclosure provides a method for a backhaul network, wherein the backhaul network comprises a first communication apparatus connected to a core network and a plurality of second communication apparatuses performing wireless communication with the first communication apparatus, the method comprising causing at least one second communication apparatus of the plurality of second communication apparatuses to: receive a first indication signal from a first communication apparatus that operates as a primary donor, the first indication signal including node type information indicating a secondary donor; in response to receiving the first indication signal, operate as a secondary donor; and allow connection to a second communication apparatus of the plurality of second communication apparatuses that operates as a member node, wherein the primary donor establishes a direct backhaul link to the core network, the secondary donor establishes a backhaul link to the core network through the primary donor, and the member node establishes a backhaul link to the core network through the secondary donor and the primary donor.

The present disclosure provides method for a backhaul network, wherein the backhaul network comprises a first communication apparatus connected to a core network and a plurality of second communication apparatuses performing wireless communication with the first communication apparatus, the method comprising causing at least one second communication apparatus of the plurality of second communication apparatuses to: receive a second indication signal from a first communication apparatus that operates as a primary donor, the second indication signal including node type information indicating a member node; and in response to receiving the second indication signal, operate as a member node and connect to a second communication apparatus of the plurality of second communication devices that operates as a secondary donor, wherein the primary donor establishes a direct backhaul link with the core network, the secondary donor establishes a backhaul link to the core network through the primary donor, and the member node establishes a backhaul link to the core network through the secondary donor and the primary donor.

The present disclosure provides a method for a backhaul network, wherein the backhaul network comprises a first communication apparatus connected to a core network and a plurality of second communication apparatuses performing wireless communication with the first communication apparatus, the method comprises: causing the first communication apparatus to perform the method performed by a primary donor, causing at least one second communication apparatus of the plurality of second communication apparatuses to perform the method performed by a secondary donor, and causing at least another second communication apparatus of the plurality of the second communication apparatuses to perform the method performed by a member node.

The present disclosure provides a non-transitory computer-readable storage medium having stored thereon instructions that, when executed by a processor, cause the processor to perform the method of the present disclosure.

BRIEF DESCRIPTION OF DRAWINGS

A better understanding of the present disclosure will be obtained when the following detailed description of the embodiments is considered in conjunction with the following drawings. The same or similar reference numerals are used throughout the drawings to refer to the same or like parts. The accompanying drawings, together with the following detailed description, which are incorporated in and form a part of the specification, serve to illustrate embodiments of the present disclosure and explain the principles and advantages of the disclosure.

DETAILED DESCRIPTION

Figure 1:
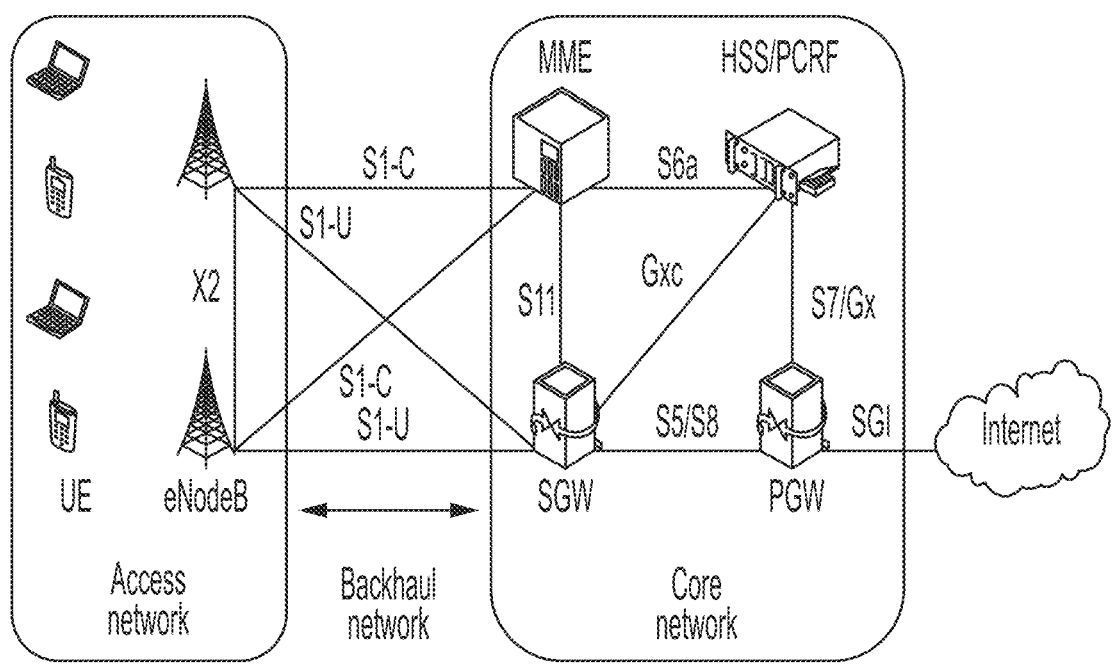
FIG. 1 illustrates a typical network architecture in a 4G LTE system.

In the following, preferred embodiments of the present disclosure will be described in detail with reference to the accompanying drawings. Note that in the present specification and the drawings, structural elements having substantially the same function and structure are denoted by the same reference numerals, and repeated description thereof is omitted.

The description will be made in the following order:
1. Overview of system
2. Procedure of processes
3. Simulation results
4. Application examples <1. Overview of System>

First, a schematic topology of a backhaul network and a data distribution and aggregation process thereof of some embodiments of the present disclosure will be described.

Topology Structure of Backhaul Network

In a backhaul network of some embodiments of the present disclosure, base stations are logically divided into four types of donors: a primary donor, a secondary donor, a member node and a direct node. The primary donor establishes a direct backhaul link with the core network, the secondary donor establishes a backhaul link to the core network through the primary donor, the member node establishes a backhaul link to the core network through the secondary donor and the primary donor, and the direct node establishes a backhaul link to the core network through the primary donor. The primary donor, the secondary donor, the member node and the direct node all have an IAB function, which can establish a backhaul link and an access link of user equipment using the same frequency resource and infrastructure.

The primary donor is usually implemented by a macro base station (macro BS) and directly accesses to the core network using conventional backhaul techniques (e.g., optical fibers or directional antennas). In addition, the primary donor is also connected with secondary donors and direct nodes and is responsible for aggregating and distributing backhaul data between the core network and each node connected to the primary donor. The primary donor allows other nodes to establish backhaul links to the core network through the primary donor.

The secondary donor, the member node, and the direct node are usually implemented by small base stations, such as micro base stations (micro BSs), pico base stations (pico BSs), and generally disable or do not have a direct backhaul link with the core network, such as an optical fiber or a directional antenna. The secondary donor is connected to the primary donor and member nodes and is responsible for aggregating and distributing backhaul data between the primary donor and the connected member nodes. The secondary donor allows other nodes to establish backhaul links to the core network through the secondary donor. The member node is a node that is not selected to be the secondary donor and establishes a backhaul link to the core network through the secondary donor. The direct node is a node that is not selected to be the secondary donor and is directly connected to the primary donor for some special reason during network initialization or after completing of link recovery. The member node and the direct node do not allow other nodes to establish backhaul links to the core network through the member node or the direct node.

Furthermore, in some embodiments of the present disclosure, more levels of backhaul networks may be constructed. For example, each secondary donor may be treated as a primary donor of a sub-network and function as a primary donor within that sub-network. For example, each member node may be considered as a secondary donor of a sub-network and function as a secondary donor within the sub-network. By analogy, a backhaul network with more levels can be constructed.

Figure 2:
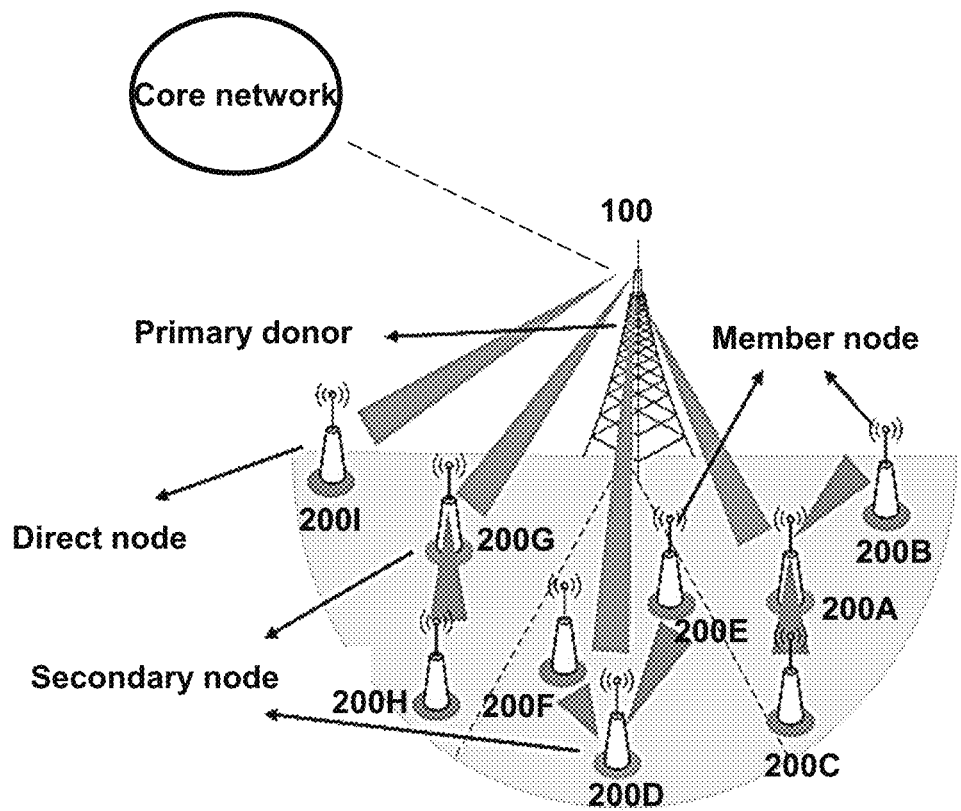
FIG. 2 illustrates a backhaul network of some embodiments of the present disclosure.

FIG. 2 illustrates a backhaul network of some embodiments of the present disclosure. The backhaul network includes base station 100 and base stations 200A—200I. Base station 100 operates as a primary node with a direct backhaul link (e.g., optical fibers or directional antennas) to the core network. Base stations 200A, 200D, 200G operate as secondary donors that establish backhaul links to the core network through base station 100 that operates as the primary donor. Base stations 200B, 200C, 200E, 200F, 200H operate as member nodes that establish backhaul links to the core network through base stations 200A, 200D, 200G operating as secondary donors respectively and base station 100 operating as the primary donor. Base station 200I operates as a direct node that establishes a backhaul link to the core network through base station 100 operating as the primary donor.

Base station 100 and base stations 200A—200I serve user equipment in respective cells, respectively, transmit data from the core network to the user equipment in the respective cells (downlink data distribution), and transmit data from the user equipment in the respective cells to the core network (uplink data aggregation).

Downlink Data Distribution Process

In the downlink data distribution process of the backhaul network, base station 100 operating as the primary donor, upon receiving data from the core network, transmits the data from the core network to user equipment in the cell served by base station 100 or to base stations 200A, 200D, 200G operating as the secondary donors, according to a destination of the data.

Base station 200A operating as the secondary donor, upon receiving the data from base station 100, transmits the data from base station 100 to user equipment in the cell served by base station 200A itself or to base stations 200B, 200C operating as member nodes, according to the destination of the data. Base station 200D operating as the secondary donor, upon receiving the data from base station 100, transmits the data from base station 100 to user equipment in the cell served by base station 200D itself or to base stations 200E and 200F operating as member nodes, according to the destination of the data. Base station 200G operating as the secondary donor, upon receiving the data from base station 100, transmits the data from base station 100 to user equipment in the cell served by base station 200G itself or to base station 200H operating as the member node, according to the destination of the data.

Base stations 200B, 200C operating as member nodes, upon receiving the data from base station 200A, transmit the data from base station 200A to user equipment in the cell served by base stations 200B, 200C themselves, according to the destination of the data. Base stations 200E, 200F operating as member nodes, upon receiving the data from base station 200D, transmit the data from base station 200D to user equipment in the cell served by base stations 200E, 200F themselves, according to the destination of the data. Base station 200H operating as the member node, upon receiving the data from base station 200G, transmits the data from base station 200G to user equipment in the cell served by base station 200H itself, according to the destination of data.

Base station 200I operating as the direct node, upon receiving the data from base station 100, transmits the data from base station 100 to user equipment in the cell served by base station 200I itself, according to the destination of the data.

Uplink Data Aggregation Process

In the uplink data aggregation process of the backhaul network, base stations 200B, 200C operating as member nodes, upon receiving data from user equipment in the cell served by base stations 200B, 200C themselves, transmit the data from the user equipment to base station 200A operating as the secondary donor. Base stations 200E, 200F operating as member nodes, upon receiving data from user equipment in the cell served by base stations 200E, 200F themselves, transmit the data from the user equipment to base station 200D operating as the secondary donor. Base station 200H operating as the member node, upon receiving data from user equipment in the cell served by base station 200H itself, transmits the data from the user equipment to base station 200G operating as the secondary donor.

Base station 200I operating as the direct node, upon receiving data from the user equipment, transmits the data from the user equipment to base station 100 operating as the primary donor.

Base station 200A operating as the secondary donor, upon receiving data from user equipment served by base station 200A itself or from base stations 200B, 200C operating as the member nodes, transmits the data, from the user equipment or base stations 200B, 200C operating as the member nodes, to base station 100 operating as the primary donor. Base station 200D operating as the secondary donor, upon receiving data from the user equipment in its own serving cell or from base stations 200E, 200F operating as the member nodes, transmits the data from the user equipment in its own serving cell or base stations 200E, 200F operating as the member nodes to base station 100 operating as the primary donor. Base station 200G operating as the secondary donor, upon receiving data from the user equipment in its own serving cell or base station 200H operating as the member node, transmits the data from the user equipment in its own serving cell or from base station 200H operating as the member node to base station 100 operating as the primary donor.

Base station 100 operating as the primary donor, upon receiving data from the user equipment in its own serving cell or from base stations 200A, 200D, 200G operating as the secondary donors, transmits data from the user equipment in its own serving cell or from base stations 200A, 200D, 200G operating as the secondary donor to the core network.

Compared with the conventional wireless backhaul network, the topology of the backhaul network of the embodiments of the present disclosure provides at least the following advantages:

a. improving frequency spectrum efficiency: the secondary donor is obtained through selection, and compared with the member nodes connected with the secondary donor, the secondary donor has a channel state that is more suitable for establishing a backhaul link with the primary donor, thus the spectrum efficiency of the link is improved.

b. flexible anti-interference: in the conventional wireless backhaul, cross-link interference (CLI) between the access link and the backhaul link and cross-node interference (CNI) between adjacent nodes can only be addressed by scheduling time-frequency resources, which may degrade system performance. In the backhaul network of the embodiments of the disclosure, the topological structure of the backhaul network can be fully utilized, and the CLI and the CNI can be flexibly avoided from an aspect of beams, thereby improving the anti-interference capability of the system.

c. robust anti-occlusion: because of the mobile deployment of the small base station and the low height of the antenna, beams of the backhaul link may be blocked and thus fail, so in the conventional wireless backhaul network, the beam failure recovery can only be performed by means of beam switching, but what obtained by the switching is usually a non-direct path with a low gain, which has a great influence on the receiving signal-to-noise ratio of the backhaul link. In the backhaul network of the embodiments of the present disclosure, link recovery may be performed through node switching by using a grouped and multi-hop topology structure, so as to ensure that the backhaul link can always use high gain of a direct beam to improve backhaul quality.

In addition, the base stations in the backhaul network proposed by the present disclosure can adopt the same frequency resources and infrastructure as the access network does to construct the backhaul link, and the backhaul link and the access link are both supported at the same time so as to integrate the two links.

Node Identifier

In some embodiments of the present disclosure, to more easily distinguish different types of nodes and to simplify a synchronization process during network initialization and network topology changes, a base station operating as a primary donor is assigned with an identifier in a default set of identifiers, a base station operating as a secondary donor is assigned with a default identifier in a first predefined set of identifiers, and a base station operating as a member node is assigned with an identifier in a second predefined set of identifiers. The default set of identifiers, the first predefined set of identifiers and the second predefined set of identifiers do not include a common identifier.

In a case where it is unnecessary to distinguish a direct node from a member node by an identifier, a base station operating as a direct node may be assigned with an identifier in the second predefined set of identifiers. In a case where it is necessary to distinguish a direct node from a member node by an identifier, a base station operating as a direct node may be assigned with an identifier in a third predefined set of identifiers. Wherein the default set of identifiers, the first predefined set of identifiers, the second predefined set of identifiers and the third predefined set of identifiers do not include a common identifier.

Each identifier may correspond to a synchronization sequence, and thus a synchronization signal may serve to distinguish among the various base stations in the communication system. In addition, a node type of a base station can be identified by detecting a synchronization sequence in a received synchronization signal to identify an identifier that is assigned to the base station that broadcasts the synchronization signal.

In some embodiments of the present disclosure, the base station operating as the primary node is assigned with a default identifier of the default set of identifiers. Other base stations access to the base station operating as the primary donor by detecting a synchronization signal that broadcasts a synchronization sequence corresponding to the default identifier. In some embodiments of the present disclosure, a base station operating as a secondary donor is assigned with an identifier of a first predefined set of identifiers. Thus, a base station operating as a member node accesses to the base station operating as the secondary donor by detecting a synchronization signal that broadcasts a synchronization sequence corresponding to an identifier in the first predefined set of identifiers.

The synchronization signal of some embodiments of the present disclosure may include two parts: a primary synchronization signal (PSS) and a secondary synchronization signal (SSS). Each part of the synchronization signal is implemented by a specific sequence. There are 3 optional sequences (marked as $N_{ID}^{P}=0, 1, 2$) for SS and 168 optional sequences (marked as $N_{ID}^{S}=0, \ldots, 167$) for SSS, and thus, there may be 504 (3*168) sequences for synchronization signals, which may be represented by numbers from 0 to 503, $$N_{PCI}=168*N_{ID}^{P}+N_{ID}^{S}.$$

In some embodiments of the present disclosure, a user equipment detects and compares received synchronization signals from various base stations, selects a base station with the best channel state, and then performs synchronization and access.

In some embodiments of the present disclosure, when the user equipment accesses to the base station, a hop count (corresponding to a certain delay) from the base station to the core network may also be considered, in addition to channel conditions. In some embodiments of the present disclosure, a count of link hops from the base station operating as a node of each type to the core network is: 1 hop for the primary donor, 2 hops for the secondary donor, 2 hops for the direct node, and 3 hops for the member node. With base stations operating as nodes of different types enabled to send different synchronization signals, the user equipment can identify the node type during synchronization, thereby accessing to base stations of different node types according to the user equipment's own delay requirement. Therefore, in the embodiment of the present disclosure, the user equipment, when accessing to a base station, may not only consider the channel state of each base station but also consider the count of link hops from the base station to the core network.

Structure of Base Station

Figure 3:
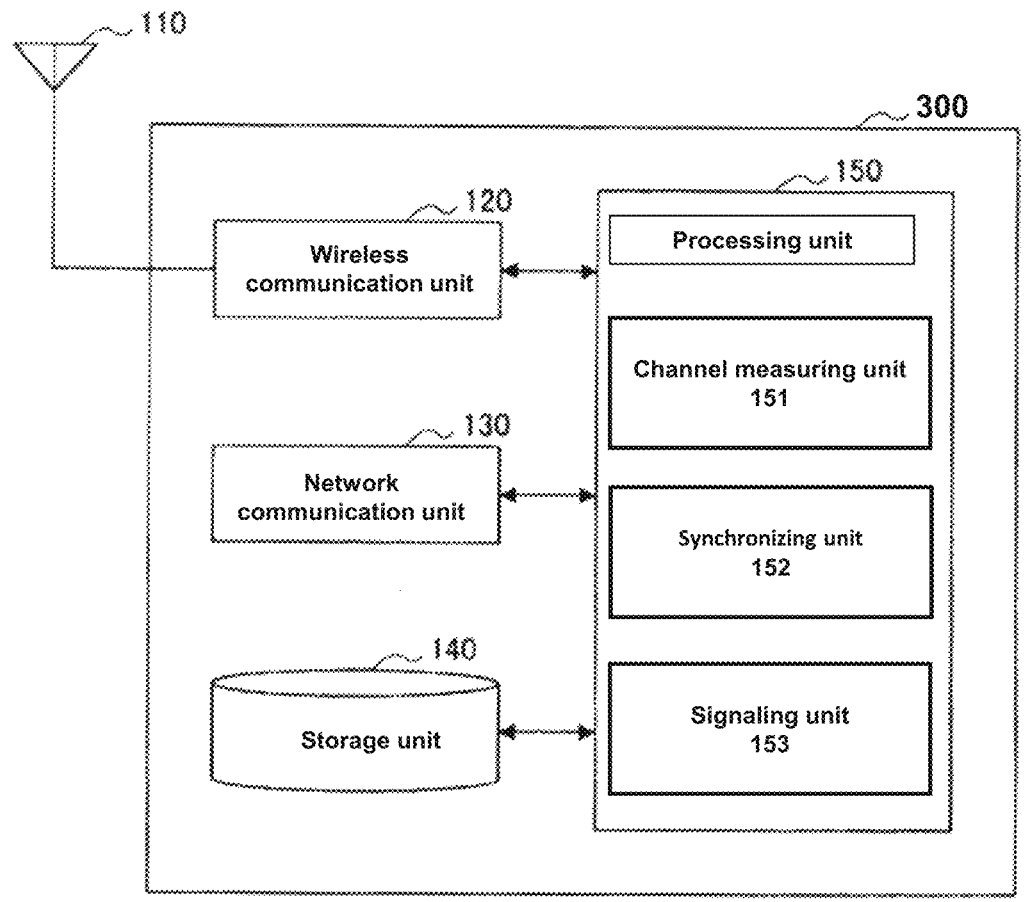
FIG. 3 illustrates a communication apparatus that may operate as a base station in some embodiments of the disclosure.

Next, the structure of the base station of some embodiments of the present disclosure will be described. FIG. 3 illustrates a communication apparatus 300 that may operate as a base station of some embodiments of the disclosure. Referring to FIG. 3, the communication apparatus 300 includes an antenna unit 110, a wireless communication unit 120, a network communication unit 130, a storage unit 140, and a processing unit 150.

The antenna unit 110 receives a radio signal and outputs the received radio signal to the wireless communication unit 120. The antenna unit 110 also transmits a transmission signal outputted from the wireless communication unit 120.

The wireless communication unit 120 wirelessly communicates with user equipment or other base stations. The network communication unit 130 communicates with a core network node. The storage unit 140 stores programs and data for operating base station 100.

The processing unit 150 provides various functions for base station 100. In some embodiments of the present disclosure, the processing unit 150 comprises a channel measuring unit 151, a synchronizing unit 152 and a signaling unit 153. The channel measuring unit 151 performs a channel measuring function, the synchronizing unit 152 performs synchronization between devices, and the signaling unit 153 performs a signaling interaction function. The channel measuring unit 151, the synchronizing unit 152 and the signaling unit 153 may be hardware circuits or software modules.

One or more functions of the communications apparatus 300 can be implemented by a processing circuitry. The processing circuitry may be configured to directly execute or control other components and/or external components of the communication device 300 to perform the functions of the communication apparatus 300. In some embodiments according to the disclosure, the processing circuitry is in a form of a general-purpose processor, or a special purpose processing circuitry, such as an ASIC. In some embodiments, the processing circuitry can be constructed from a circuit (hardware) or a central processing device such as a Central Processing Unit (CPU).

Part or all of the processing circuitry may be provided in an electronic device inside the communication apparatus 300. Part or all of the processing circuitry may be provided in an electronic device external to the communication apparatus 300, where the electronic device may be remotely located with respect to the communication apparatus 300. For example, a portion of the processing circuitry may be implemented as a remote control end of the communication device 300 or as a component of the remote control end.

The electronic device may be configured as a chip (such as an integrated circuit module comprising a single wafer), a hardware component, or a complete product. The electronic device may be configured to include one or more other components of the communication apparatus 300. For example, the electronic device may be configured to include one or more antennas. In some embodiments, the electronic device may be configured as the communication apparatus 300 itself <2. Procedure of Processes>

The topology of the backhaul network of some embodiments of the present disclosure is described above. Next, the procedure of the process of establishing and adjusting the topology of the backhaul network in some embodiments of the present disclosure will be described, which includes an initialization procedure, a new node joining procedure, and a link recovery procedure.

Initialization Procedure

Figure 4:
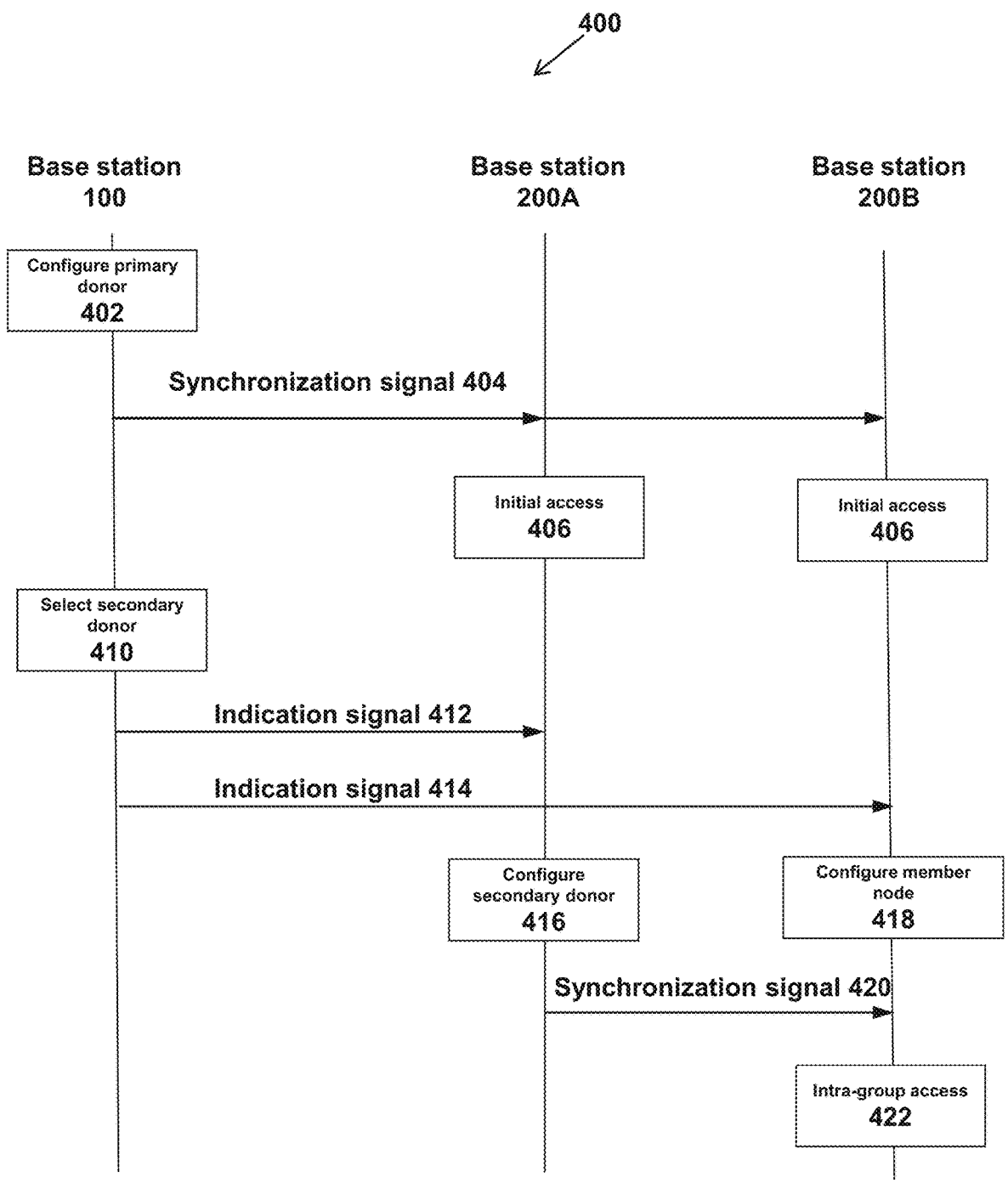
FIG. 4 illustrates an initialization procedure of topology of a backhaul network of some embodiments of the present disclosure.

FIG. 4 illustrates an initialization procedure 400 of the topology structure of the backhaul network in some embodiments of the present disclosure. When a new network is deployed in a region, the base stations have not been connected to the base station operating as the primary donor, and a connection has not been established between the base stations. At this point, each base station needs to determine its own node type and establish a connection relationship between each other.

In step 402, base station 100 that directly accesses to the core network using conventional backhaul technology (e.g., optical fibers or directional antennas) performs configuration of a primary donor, so that it can operate as the primary donor. For example, base station 100 enables various functions of a primary donor, and disables functions that only belong to a secondary donor, a member node, and a direct node. For example, base station 100 enables a backhaul link between that base station and the core network, and performs downlink data distribution and uplink data aggregation through that backhaul link. For example, base station 100 allows other base stations to access to base station 100 and establish a backhaul link through base station 100. For example, base station 100 stops searching for synchronization signals transmitted from other base stations and stops accessing to other base stations. In some embodiments of the present disclosure, base station 100 may complete configuration of the primary donor by modifying values of corresponding fields in the configuration information.

In step 404, base station 100 broadcasts a synchronization signal so that a user equipment or other base stations can search for the synchronization signal and access to base station 100. In some embodiments of the present disclosure, the synchronization signal broadcast by base station 100 includes a synchronization sequence that corresponds to a default identifier in a default set of identifiers, so that other base stations can recognize that base station 100 is a base station operating as the primary donor.

In step 406, a plurality of other base stations (including base stations 200A, 200B) other than base station 100 make initial access. For example, after searching for the synchronization signal transmitted by base station 100, other base stations synchronize with base station 100 and access to base station 100.

In step 410, base station 100 selects, from the plurality of other base stations accessing to base station 100, one or more base stations to operate as secondary donors.

In some embodiments of the present disclosure, base station 100 group the plurality of other base stations into at least one group and selects one base station in each group to operate as the secondary donor. The grouping may be based on geographical locations or channel information of the other base stations.

Figure 5A:
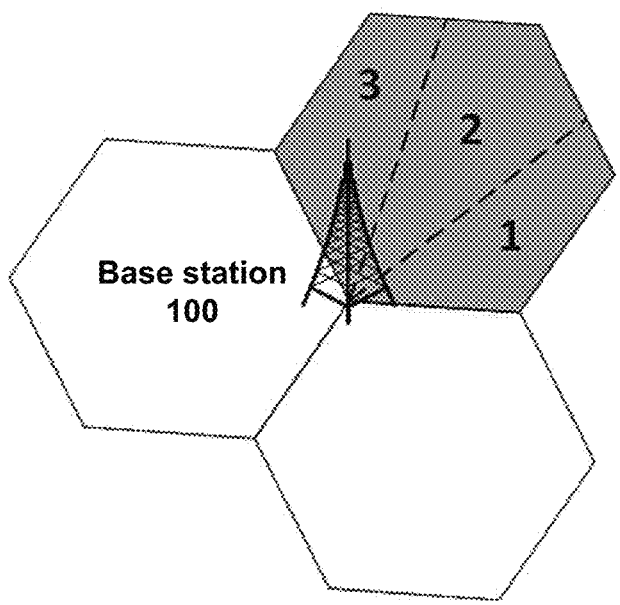
FIGS. 5A and 5B exemplarily illustrate a method of grouping a plurality of other base stations by azimuth.
Figure 5B:
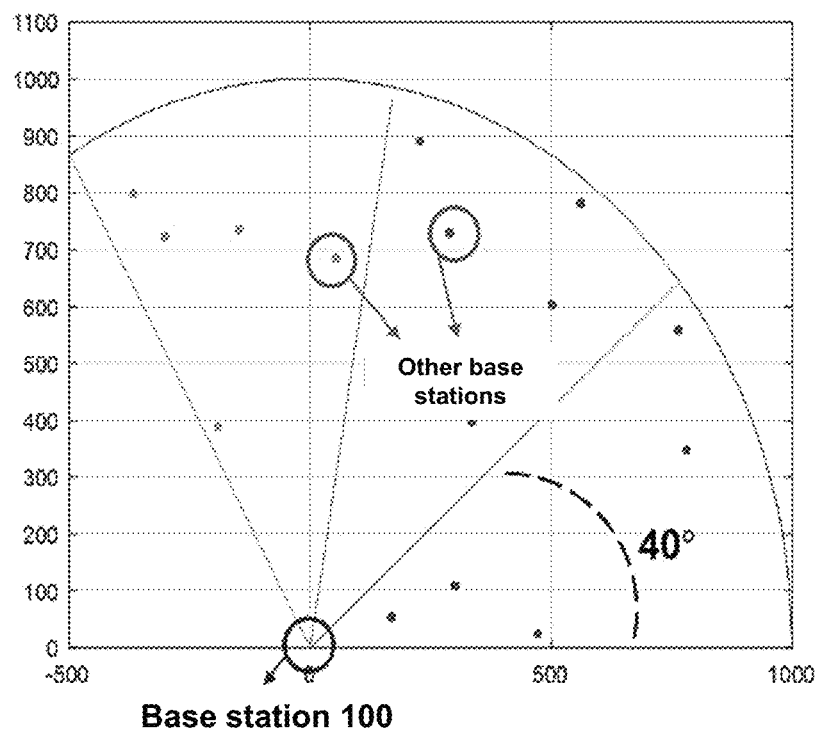

In some embodiments of the present disclosure, the other base stations are grouped based on geographic locations, so as to group base stations that are located in close proximity into a same group. For example, the other base stations may be grouped by their azimuths relative to the base station operating as the primary donor. FIGS. 5A and 5B exemplarily illustrate a method of grouping the plurality of other base stations by the azimuth. Assuming each sector is 120 degree, an azimuth of the other base stations with respect to base station 100 is between 0 and 120 degrees. The azimuth of 0 to 120 degrees may be divided into G angle intervals, and base stations falling in a same angle interval may be grouped into a same group. For example, the following decision may be made $$k \in S_g, \text{if } \theta_k \in \left[\frac{120}{G}(g-1), \frac{120}{G}g\right]$$

where $S_g$ represents a set of serial numbers of base stations that are contained in the gth group. Clustering algorithms may also be employed in the scheme of grouping the other base stations based on geographic locations. For example, a classical clustering algorithm (e.g., K-means) is applied to the geographical coordinates of the other base stations to classify the other base stations into G classes, each class forming a group.

In some embodiments of the present disclosure, the plurality of other base stations are grouped based on channel information. Assuming Hk is the downlink channel matrix between base station 100 operating as the primary donor and the kth other base station. For example, a classical clustering algorithm (e.g., K-means) may be applied to the channel information of the other base stations to classify the other base stations into G classes, each class forming a group. In addition, a binary recursive grouping method may be applied to channel information of the other base stations to group the other base stations. In the binary recursive grouping method, a similarity factor of the kth other base station with respect to the 1st other base station is defined as $$\delta_k = \frac{\|H_k - H_1\|_F}{\|H_1\|_F}$$

where $\|\cdot\|_F$ represents the F-norm of the corresponding matrix. The base stations are ranked according to similarity factors from small to large to obtain a sequence $\{i_1, i_2, \ldots, i_K\}$, so that $$\delta_{i_1} \leq \delta_{i_2} \leq \ldots \leq \delta_{i_K}$$

The sequence is divided into two subsequences according to parity, namely $\{i_1, i_3, i_5, \ldots\}$ and $\{i_2, i_4, i_6, \ldots\}$, and then the two subsequences are further divided into four subsequences according to parity, and so on, until a desired quantity of subsequences is obtained. Base stations in a same subsequence may be grouped into one group.

After the grouping is completed, one base station is selected from each group and by base station 100 operating as the primary donor to operate as the secondary donor, and the remaining base stations in the group will operate as member nodes.

In some embodiments of the present disclosure, the base station with the greatest reception power gain in each group is selected to operate as the secondary node.

Use $n_g$ as the serial number for the base station selected to operate as the secondary donor in the gth group, the selection process may be represented as:

$$n_g = \arg\max_{k \in S_g} f(k)$$

where f(•) represents the greatest reception power gain after beamforming, i.e.

$$f(k) = \max_{x \in X, y \in Y} |x^* H_i y|$$

where y and x are beams used by the transmitting end and the receiving end, respectively, and Y and X are codebooks used by the transmitting end and the receiving end, respectively. This selection scheme is relatively simple, and when a given base station is examined, channel information related to other base stations is not needed.

In some embodiments of the present disclosure, the base station having a channel state that is closest to an average channel state within the group is selected to operate as the secondary donor. That is, the base station having the relatively most "equalized" channel state among the base stations is selected to operate as the secondary donor. Using $n_g$ as the serial number for the base station selected to operate as the secondary donor in the gth group, the selection process may be represented as:

$$n_g = \arg\min_{k \in S_g} \|H_k - \overline{H}_g\|_F$$

where $\overline{H}_g$ is an average of the channel coefficients of the base stations in the group, i.e., $$\overline{H}_g = \frac{1}{|S_g|}\sum_{k \in S_g} H_k$$

This selection is relatively complex, because when a given base station is examined, channel information of other base stations needs to be considered.

Described above is a manner of selecting a base station to operate as the secondary donor on the basis of grouping other base stations. In some embodiments of the present disclosure, a base station operating as the secondary donor may be selected without grouping. For example, base station 100 operating as the primary donor may select a predetermined number of other base stations to operate as secondary donors such that a reception power gain of each of the selected base stations is higher than a reception power gain of each of the unselected base stations. That is, assuming that it is necessary to select G base stations to operate as secondary donors, base station 100 operating as the primary donor selects G base stations having the maximum reception power gain from the other base stations to operate as the secondary donors.

In some embodiments of the present disclosure, base station 100 operating as the primary donor assigns node identifiers to other accessing base stations. For example, after selecting base stations to operate as the secondary donors, base station 100 operating as the primary donor assigns identifiers in the first predefined set of identifiers to base stations that are selected to operate as the secondary donors and assigns identifiers in the second predefined set of identifiers to base stations that are not selected to operate as the secondary donors, so that the node type of the base stations can be simply distinguished by node identifiers.

In step 412, base station 100 operating as the primary donor transmits an indication signal to base station 200A selected to operate as the secondary donor to inform that base station 200A has been selected to operate as the secondary donor. The indication signal sent in step 412 may include node type information indicating the secondary donor. In step 414, base station 100 operating as the primary donor transmits an indication signal to base station 200B not selected to operate as the secondary donor to inform base station 200B to operate as the member node. The indication signal transmitted in step 414 may include node type information indicating the member node.

In some embodiments of the present disclosure, the indication signal includes a node type field, which is assigned with a different value for indicating a node type to be operated by a base station receiving the indication signal. For example, when the value in the node type field is 0, it indicates that the base station receiving the indication signal is to operate as the secondary donor; when the value in the node type field is 1, it indicates that the base station receiving the indication signal is to operate as the member node; and when the value in the node type field is 2, it indicates that the base station receiving the indication signal is to operate as the member node.

In some embodiments of the present disclosure, the indication signals transmitted in steps 412, 414 include a node identifier field, which includes a node identifier that is assigned by base station 100 operating as the primary donor to other base stations. For example, the node identifier field of the indication signal transmitted to base station 200A in step 412 includes an identifier that is selected from the first predefined set of identifiers, and the node identifier field of the indication signal transmitted to base station 200B in step 414 includes an identifier that is selected from the second predefined set of identifiers.

In some embodiments of the present disclosure, the base station receiving the indication signal may determine which type of node to operate as a result of the node identifier in the indication signal. For example, the base station stores the default set of identifiers, the first predefined set of identifiers and the second predefined set of identifiers in a memory. By determining which set of identifiers includes the node identifier of the indication signal, the base station can determine which type of node it is to operate as.

In step 416, base station 200A performs configuration of a secondary donor so that it can operate as a secondary donor. For example, base station 200A enables functions of a secondary donor and disables functions that only belong to a primary donor, a member node, and a direct node. For example, base station 200A disables the direct backhaul link to the core network, and establishes a backhaul link between base station 200A and the core network through base station 100 operating as the primary donor, where downlink data distribution and uplink data aggregation are performed through that backhaul link. For example, base station 200A allows other base stations to access to base station 200A and establish backhaul links through base station 200A. For example, base station 200A stores the node identifier of the indication signal received in step 412 in a node identifier field in the memory of base station 200A. In some embodiments of the present disclosure, base station 200A may complete the configuration of the secondary donor by modifying values of corresponding fields in the configuration information.

In step 418, base station 200B performs configuration of a member node so that it can operate as a member node. For example, base station 200B enables functions of a member node and disables functions that only belong to a primary donor, a secondary donor, and a direct node. For example, base station 200B disables a direct backhaul link to the core network, and establishes a backhaul link between base station 200B and the core network through the base station operating as the secondary donor, where downlink data distribution and uplink data aggregation are performed through that backhaul link. For example, base station 200B does not allow other base stations to access to base station 200B and establish a backhaul link through base station 200B. For example, base station 200B initiates an intra-group access procedure to access to the base station operating as the secondary donor. For example, base station 200B stores the node identifier of the indication signal received in step 414 in the node identifier field in the memory of base station 200B. Further, base station 200B operating as the member node may broadcast a synchronization signal that corresponds to its node identifier, so that a user equipment can access to base station 200B. In some embodiments of the present disclosure, base station 200B may complete the configuration of the member node by modifying values of corresponding fields in the configuration information.

In step 420, base station 200A operating as the secondary donor broadcasts a synchronization signal that corresponds to the node identifier of base station 200A, so that a user equipment or base stations operating as member nodes can search for that synchronization signal and access to base station 200A. In some embodiments of the present disclosure, the synchronization signal broadcast by base station 200A includes a synchronization sequence corresponding to the node identifier of base station 200A, so that other base stations can recognize that base station 200A is a base station operating as the secondary donor.

In step 422, base station 200B operating as a member node performs the intra-group access procedure. For example, base station 200B searches for a synchronization signal that broadcasts a synchronization sequence including a node identifier corresponding to the secondary donor, and accesses to a base station that broadcasts that synchronization signal. In a case where base station 200B receives synchronization signals from a plurality of base stations operating as secondary donors, base station 200B selects one base station from the plurality of base stations operating as secondary donors to synchronize and access to that base station. For example, in a case where base station 200B operating as the member node accesses to base station 200A operating as the secondary donor, base station 200B operating as the member node establishes a backhaul link to a backhaul network through base station 200A operating as the secondary donor and base station 100 operating as the primary donor, and performs uplink data aggregation and downlink data distribution through that backhaul link.

In some embodiments of the present disclosure, base station 100 operating as the primary donor recommends a secondary donor to be accessed to by the base station operating as the member node. For example, in a case where base station 100 groups other accessing base stations, base station 100 recommends, to a base station operating as the member node, a secondary donor in the group in which the base station as a member node belongs. In addition, base station 100 may also recommend a secondary donor to be accessed to by the base station operating as the member node based on geographical locations and the channel information. For example, base station 100 recommends a secondary donor that is geographically close to the base station operating as the member node. For example, base station 100 recommends, to the base station operating as the member node, one or more secondary donors having the best channel quality for the backhaul link with base station 100. Base station 100 may include the node identifier(s) of the recommended secondary donor(s) in the indication signal transmitted in step 414. For example, the indication signal transmitted in step 414 may include a recommended secondary donor identifier field, which includes a node identifier of a secondary donor that is recommended by base station 100 for base station 200B operating as the member node to access.

In some embodiments of the present disclosure, base station 100 operating as the primary donor does not recommend a secondary donor to be accessed to by the base station operating as the member node. Therefore, the base station operating as the member node needs to select a secondary donor to be accessed by itself. In a case where the base station operating as the member node only finds a single synchronization signal transmitted from one secondary donor, the base station can directly access to that secondary donor. In a case where the base station operating as the member node finds synchronization signals transmitted by a plurality of secondary donors, the base station may compare channel quality with the plurality of secondary donors and access a secondary donor with the best channel quality.

In some embodiments of the present disclosure, the base station operating as the member node may select to access a secondary donor or not. For example, base station 200B operating as the member node may compare channel quality between itself and base station 100 operating as the primary donor and channel quality between itself and the base station operating as the secondary donor. When the channel quality between base station 200B and the base station operating as the secondary donor does not satisfy communication requirement of base station 200B, base station 200B does not access to the base station operating as the secondary donor. In addition, when base station 200B operating as the member node requires a delay of the backhaul link to be low, or when a delay of the backhaul link from the base station operating as the secondary donor to the core network is higher than the highest delay that base station 200B can tolerate, base station 200B may choose not to access the base station operating as the secondary donor.

In some embodiments of the present disclosure, when the base station operating as the member node choose not to access a secondary donor, the base station may request the base station operating as the primary donor to switch it to be a direct node. For example, base station 200B operating as the member node may transmit to base station 100 operating as the primary donor a request for switching to be a direct node. Base station 100 operating as the primary donor, upon receiving a request for switching to be a direct node, may reassign a node identifier to the base station that transmitted the request. For example, base station 100 operating as the primary donor assigns an identifier in the third predefined set of identifiers to the base station that transmitted the request. Base station 100 operating as the primary donor may transmit to the base station that transmitted the request an acknowledgement for switching to be a direct node. The acknowledgement for switching to be a direct node may include the reassigned node identifier.

In some embodiments of the present disclosure, the base station operating as the member node, after accessing to a base station operating as the secondary donor, switches the link with the primary donor from an RRC_CONNECTED state to an RRC_INACTIVE state. The RRC_INACTIVE state enables the base station operating as the member node to perform some basic signaling and information interaction with the base station operating as the primary donor in an INACTIVE state, thereby maintaining a connection with the base station operating as the primary donor with signaling and power overhead that is as little as possible. The base station operating as the member node may re-enter the RRC_CONNECTED state from the RRC_INACTIVE state, thereby restoring normal communication with the base station operating as the primary donor.

Figure 6:
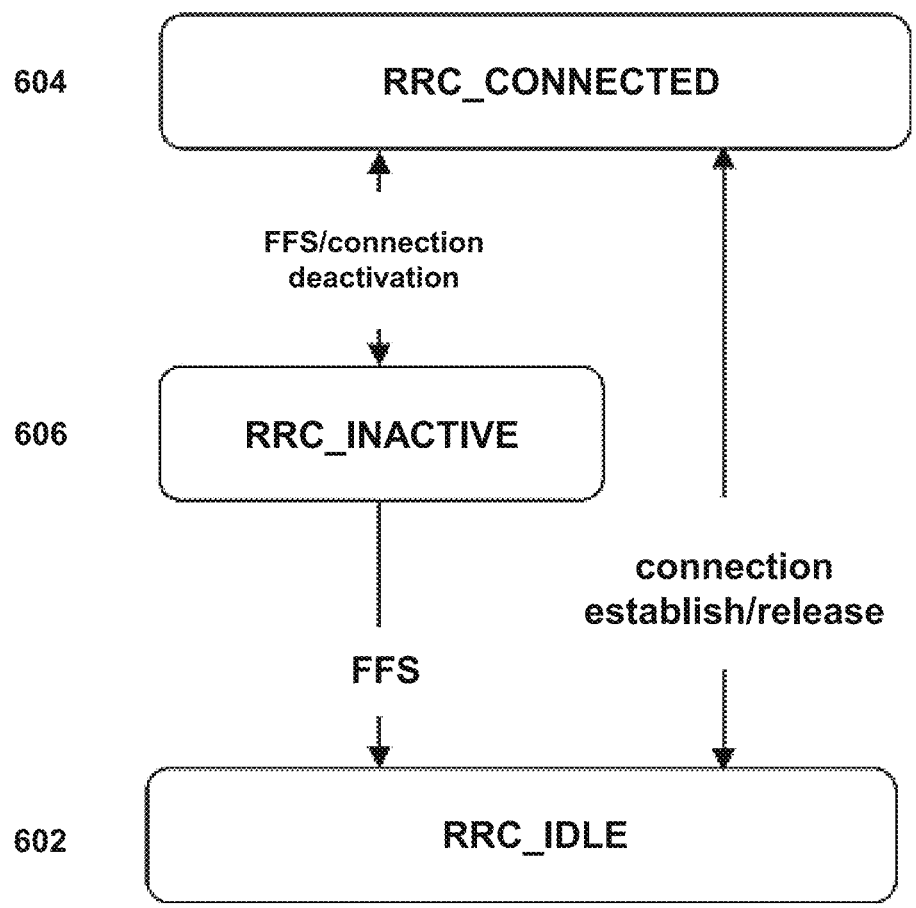
FIG. 6 illustrates a switch of a link state between a base station operating as a member node and a base station operating as a primary donor.

FIG. 6 illustrates a switching of a link state between a base station operating as the member node and a base station operating as the primary donor.

In block 602, the base station operating as the member node has not accessed to the base station operating as the primary donor yet (i.e., initial access has not been completed), and thus the connection between the two base stations is in an RRC_IDLE state. After the base station operating as the member node accesses to the base station operating as the primary node, the connection between the two base stations enters the RRC_CONNECTED state, as shown in block 604. In the RRC_CONNECTED state, the base station operating as the primary donor may assign or switch node types, assign node identifiers, and perform uplink data aggregation and downlink data distribution for the base station operating as the member node. After the base station operating as the member node accesses to the base station operating as the secondary donor (i.e., completes the intra-group access), the connection between the two base stations enters the RRC_INACTIVE state, as shown in block 606. The switching between the RRC IDLE, RRC_CONNECTED and RRC_INACTIVE states may be the same as the link state transition between UE and the base station in the 5G NR technique.

New Node Joining Process

After the initialization procedure is completed, each base station in the backhaul network has determined its own node type, and the connection relationship among different base stations is also established. When a new base station joins the backhaul network, it needs to determine a node type of the new base station and the connection relationship between the new base station and other base stations, because it has not determined the node type and the connection relationship between the new base station and other base stations is not established.

Figure 7:
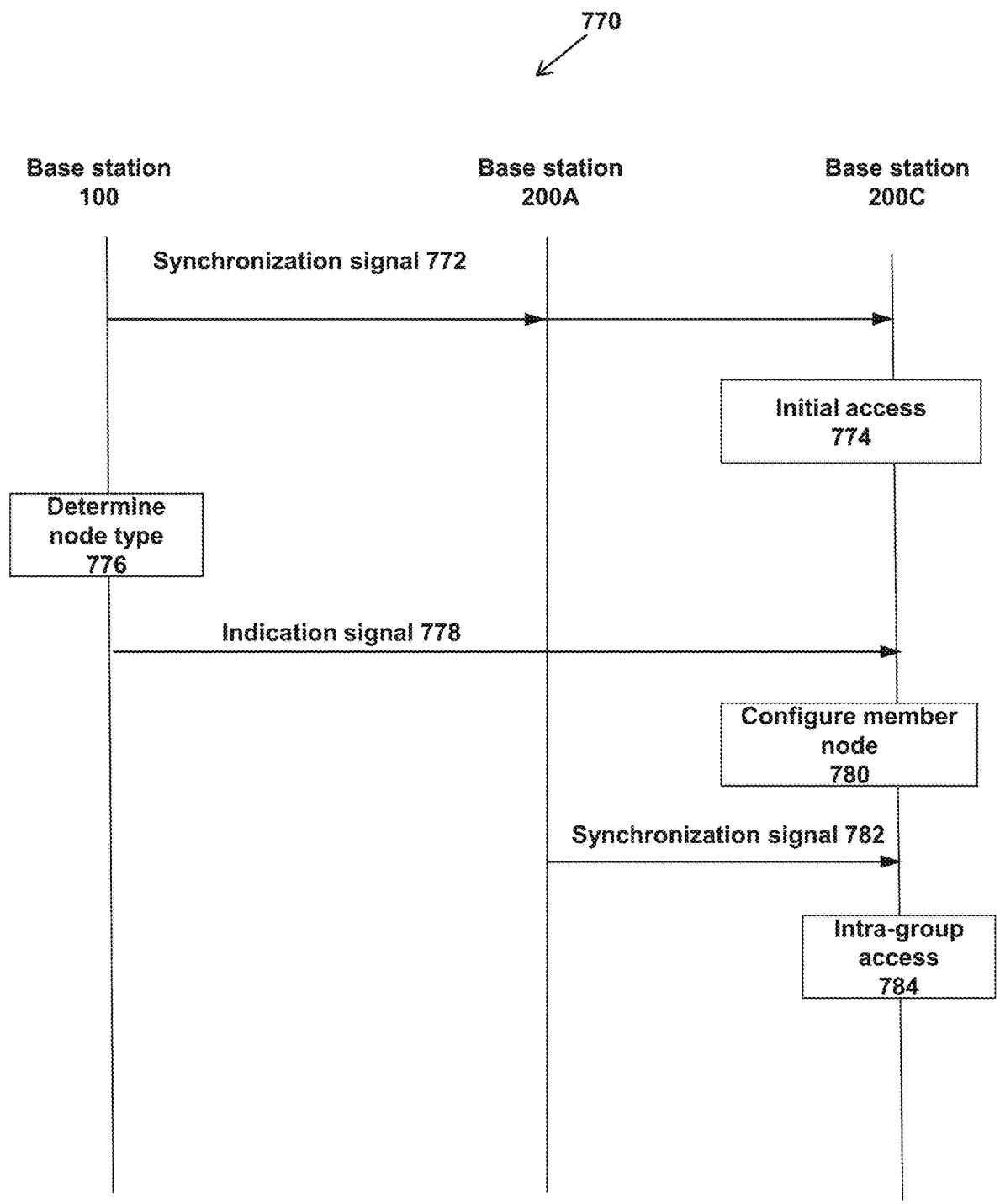
FIG. 7 illustrates a new node joining procedure in some embodiments of the present disclosure.

FIG. 7 illustrates a new node joining procedure 770 of some embodiments of the present disclosure. Base station 100 operating as the primary donor periodically broadcasts the synchronization signal, as shown in step 772. The new base station 200C, after detecting the synchronization signal broadcast by base station 100, synchronizes with base station 100 and accesses to base station 100, as shown in step 774.

In step 776, base station 100 operating as the primary node determines a node type for new base station 200C. In some embodiments of the present disclosure, base station 100 operating as the primary donor determines all new base stations that join after the initialization procedure is completed as member nodes. In some embodiments of the present disclosure, base station 100 operating as the primary donor determines the node type of the new base station based on priori information of the new base station as well as existing base stations, such as geographical locations, channel state and load condition of secondary donors. For example, in a case where there is a suitable secondary donor in the vicinity of the new base station, base station 100 determines the new base station as a member node. For example, in a case where there is no suitable secondary donor in the vicinity of the new base station, base station 100 determines the new base station as a secondary donor or a direct node. In some embodiments of the present disclosure, base station 100 operating as the primary donor determines the node type of the new base station based on a channel state of the new base station that joins after the initialization procedure is completed. For example, in a case that spatial interference between the new base station and an existing secondary donor is strong, base station 100 determines the new base station as a member node, so as to reduce the interference of the new base station on existing backhaul links in the access network. For example, in a case where spatial interference between the new base station and an existing secondary donor is weak, base station 100 determines the new base station as a secondary donor or a direct node. In order to reduce the impact of the new base station on the topology of the access network, the new base station may be preferably determined as a member node, and the following steps will be described for this situation.

In step 778, base station 100 operating as the primary donor transmits an indication signal to new base station 200C to notify node type of base station 200C. The indication signal transmitted in step 778 may include node type information indicating the member node. The indication signal transmitted in step 778 may further include a node identifier field which includes a node identifier assigned by base station 100 operating as the primary donor to new base station 200C. For example, the node identifier field of the indication signal transmitted to base station 200C in step 778 includes an identifier selected from the second predefined set of identifiers to indicate new base station 100 to operate as the member node.

In step 780, new base station 200C performs configuration of the member nodes so that it can operate as the member node. For example, new base station 200C enables functions of a member node and disables functions that only belong to a primary donor, a secondary donor, and a direct node. For example, new base station 200C disables the direct backhaul link to the core network, and establishes a backhaul link between the new base station and the core network through the base station operating as the secondary donor, and performs downlink data distribution and uplink data aggregation through the backhaul link. For example, new base station 200C does not allow other base stations to access to new base station 200C and establish a backhaul link with new base station 200C. For example, new base station 200C initiates an intra-group access procedure to access to a base station operating as the secondary donor. For example, new base station 200C stores the node identifier of the indication signal received in step 778 in the node identifier field in the memory of new base station 200C. In some embodiments of the present disclosure, base station 200C may complete the configuration of the member node by modifying values of corresponding fields in the configuration information.

Base station 200A operating as the secondary donor periodically broadcasts a synchronization signal, so that user equipment or base stations operating as member nodes can search for the synchronization signal and access to base station 200A, as shown in step 782. In some embodiments of the present disclosure, the synchronization signal broadcast by base station 200A includes a synchronization sequence corresponding to the node identifier of base station 200A, so that other base stations can recognize that base station 200A is a base station operating as the secondary donor.

In step 784, base station 200C operating as the member node performs an intra-group access procedure. For example, base station 200C searches for a synchronization signal that broadcasts a synchronization sequence including a node identifier corresponding to a secondary donor, and accesses to the base station that broadcasts that synchronization signal. In a case where base station 200C receives synchronization signals from a plurality of base stations operating as secondary donors, base station 200C selects one base station from the plurality of base stations operating as secondary donors to synchronize and access to that base station. For example, in a case where base station 200C operating as the member node accesses to base station 200A operating as the secondary donor, base station 200C operating as the member node establishes a backhaul link to a backhaul network through base station 200A operating as the secondary donor and base station 100 operating as the primary donor, and performs uplink data aggregation and downlink data distribution through that backhaul link.

In some embodiments of the present disclosure, base station 100 operating as the primary donor recommends a secondary donor to be accessed to by new base station 200C. Base station 100 may recommend the secondary donor to be accessed to by new base station 200C based on priori information of the new base station and existing base stations, such as geographical locations, channel states and load condition of secondary donors. For example, base station 100 recommends a secondary donor close to a geographical location of new base station 200C to new base station 200C. For example, base station 100 recommends to new base station 200C one or more secondary donors having the best channel quality or the least load for the backhaul link with base station 100. Base station 100 may include a node identifier of the recommended secondary donor in the indication signal transmitted in step 778. For example, the indication signal transmitted in step 778 may include a recommended secondary donor identifier field, which includes a node identifier of a secondary donor that is recommended by base station 100 recommends for new base station 200C to access to.

In some embodiments of the present disclosure, base station 100 operating as the primary donor does not recommend a secondary donor to be accessed to by new base station 200C. Therefore, new base station 200C needs to select a secondary donor to be accessed to by itself. In a case where new base station 200C only finds a single synchronization signal transmitted by one secondary donor, the base station may directly access to that secondary donor. In a case where new base station 200C finds synchronization signals transmitted by a plurality of secondary donors, the base station may compare channel quality between itself and the plurality of secondary donors and access to a secondary donor having the best channel quality.

In some embodiments of the present disclosure, new base station 200C may choose to access to a secondary donor or not. For example, new base station 200C may compare channel quality between itself and base station 100 operating as the primary donor and channel quality between itself and a base station operating as the secondary donor. When channel quality between new base station 200C and the base station operating as the secondary donor does not satisfy communication requirement of new base station 200C, new base station 200C does not access to the base station operating as the secondary donor. In addition, when new base station 200C requires a low delay of the backhaul link, or the delay of the backhaul link from the base station operating as the secondary donor to the core network is higher than the highest delay that new base station 200C can tolerate, new base station 200C may choose not to access to the base station operating as the secondary donor.

In some embodiments of the present disclosure, when new base station 200C chooses not to access to the secondary donor, new base station 200C may request the base station operating as the primary donor to switch new base station 200C to be a direct node. For example, new base station 200C may transmit, to base station 100 operating as the primary donor, a request for switching to be a direct node. Base station 100 operating as the primary donor, upon receiving the request for switching to be a direct node, may reassign a node identifier to the base station that transmitted the request. For example, base station 100 operating as the primary donor assigns an identifier in the third predefined set of identifiers to the base station that transmitted the request, to indicate that base station to operate as the member node. Base station 100 operating as the primary donor may transmit an acknowledgement for switching to be a direct node to the base station transmitting the request. The acknowledgement for switching to be a direct node may include the reassigned node identifier.

In some embodiments of the present disclosure, new base station 200C switches the link with the primary donor from an RRC_CONNECTED state to an RRC_INACTIVE state, after accessing to the base station operating as the secondary donor. The RRC_INACTIVE state enables new base station 200C to interact with the base station operating as the primary donor in an INACTIVE state for some basic signaling and information, thereby maintaining the connection with the base station operating as the primary donor with signaling and power overhead that is as little as possible. When necessary (e.g., upon switching from being a member node to be a secondary donor or a direct node), new base station 200C may re-enter the RRC_CONNECTED state from the RRC_INACTIVE state, thereby restoring normal communication with the base station operating as the primary donor.

Link Recovery Procedure

In the wireless backhaul network, base stations are connected by wireless links. In consideration of factors such as mobile deployment of base stations and low antenna heights of small base stations, a situation often occurs that a beam between one base station and another base station is occluded to cause link failure or link quality degradation. In some embodiments of the present disclosure, beam occlusion is addressed by a link recovery procedure.

Conventional link recovery methods are based on beam switching. When a direct path beam fails, one switches to a reflection path beam to conduct wireless backhaul. However, the reflection path has a lower gain than the direct path, which reduces the signal-to-noise ratio at the receiving end of the backhaul link.

Figure 8A:
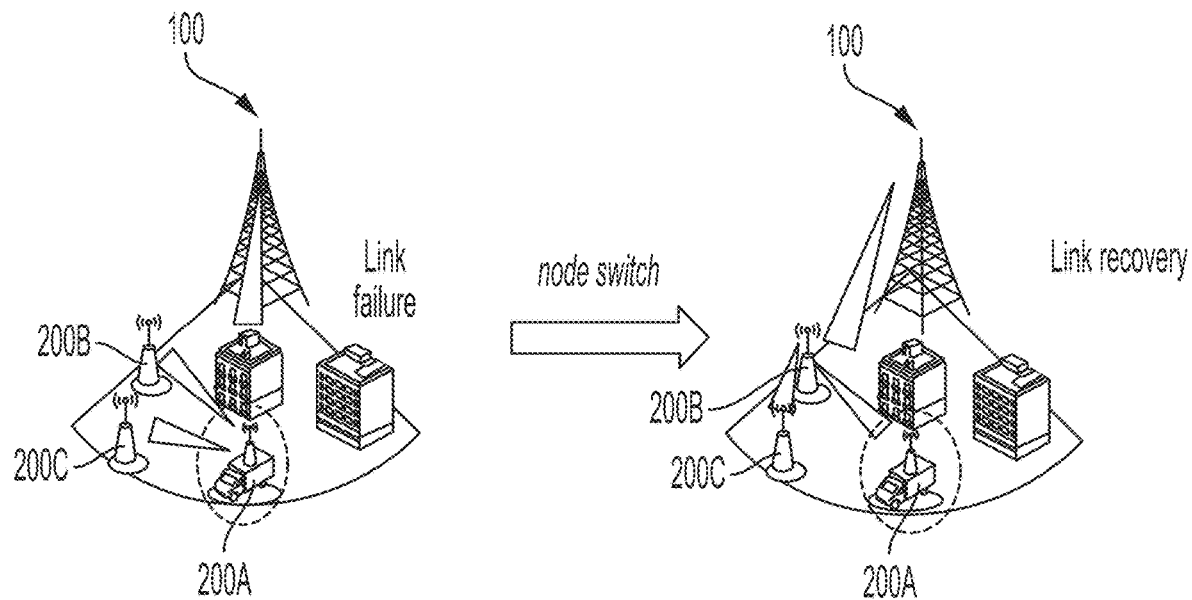
FIGS. 8A and 8B illustrate link recovery procedures for a secondary donor and a member node, respectively, in some embodiments of the present disclosure.
Figure 8B:
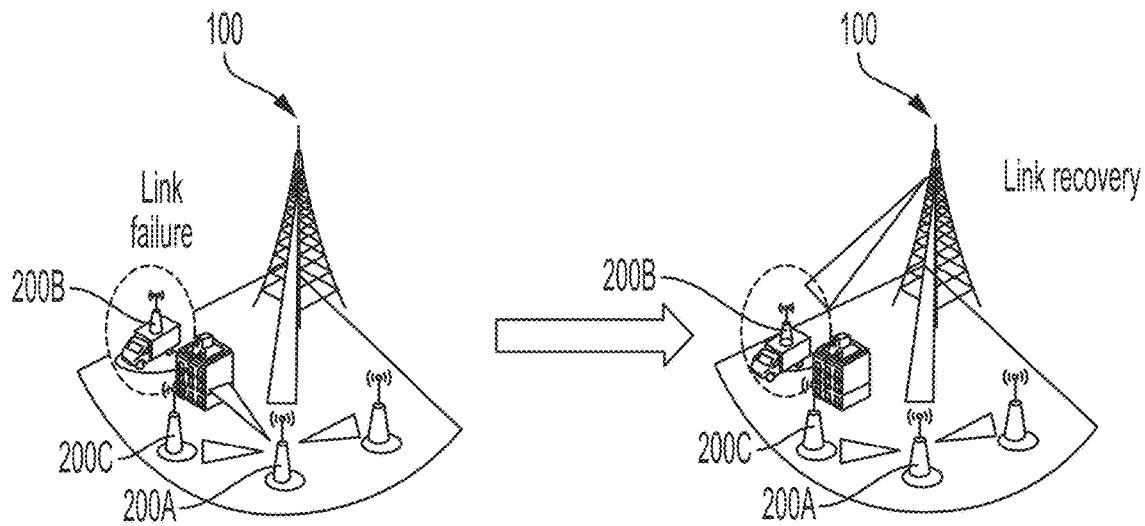

In some embodiments of the present disclosure, link failure or link quality degradation caused by, for example, beam occlusion, is addressed by changing the topology structure of the backhaul network through node type switching. FIGS. 8A and 8B illustrate link recovery procedures for a secondary donor and a member node, respectively, in some embodiments of the present disclosure.

As shown in FIG. 8A, base station 200A operating as the secondary donor suffers link failure or link quality degradation, for example, a beam between base station 200A operating as the secondary donor and base station 100 operating as the primary donor is blocked by a building therebetween. In this case, one can switch base station 200B, which is not occluded, from being a member node to be a secondary donor, switch base station 200A, which is occluded, from being a secondary donor to be a member node, and connect base station 200A that operated as the original secondary donor along with the remaining base stations that are connected to base station 200A and operated as member nodes to base station 200B, which operates as the new secondary donor.

As shown in FIG. 8B, base station 200B operating as the member node suffers link failure or link quality degradation, for example, a beam between base station 200B operating as the member node and base station 200A operating as the secondary donor is blocked by a building therebetween. In this case, one can switch the occluded base station 200B from being a member node to be a direct node and cause base station 200B to restore a connection with base station 100 operating as the primary donor.

Figure 9:
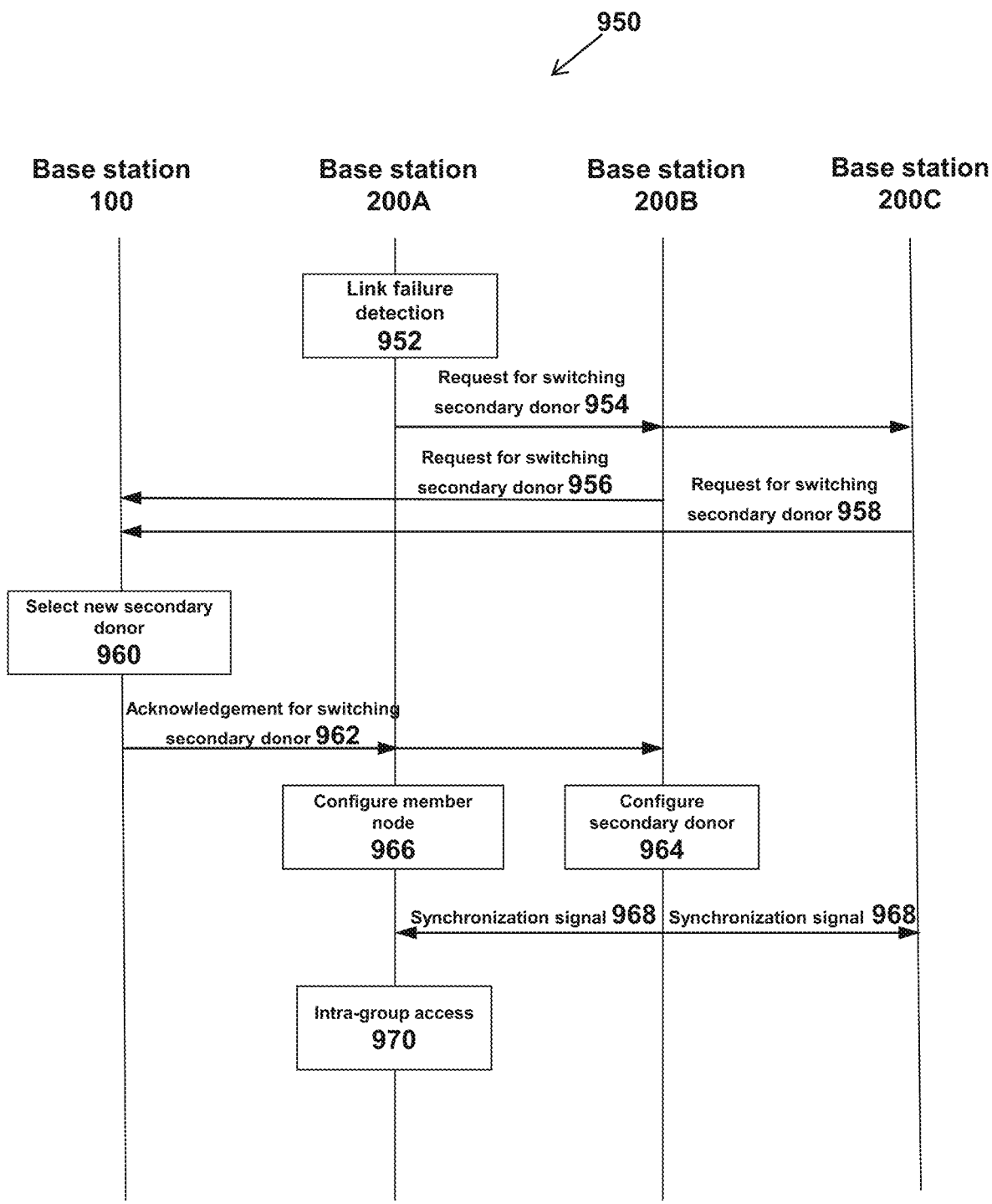
FIG. 9 illustrates a link recovery procedure for a secondary donor in some embodiments of the disclosure.

FIG. 9 illustrates a link recovery procedure 950 for a secondary donor in some embodiments of the disclosure.

In step 952, base station 200A operating as the secondary donor detects a link failure or link quality degradation, for example, a beam between base station 200A operating as the secondary donor and base station 100 operating as the primary donor is blocked by a building therebetween.

In step 954, base station 200A operating as the secondary donor broadcasts to base stations operating as member nodes and accessing to base station 200A, a request for switching the secondary donor, so that one of the base stations operating as member nodes and accessing to base station 200A may be switched to be a new secondary donor.

In step 956, after receiving the request for switching the secondary donor, base station 200B, which operates as a member node and accesses to base station 200A, transmits to base station 100 operating as the primary donor a request for switching to be a secondary donor. In step 958, after receiving the request for switching the secondary donor, base station 200C, which operates as a member node and accesses to base station 200A, transmits to base station 100 operating as the primary donor a request for switching to be a secondary donor. Base station 200B, 200C may decide whether to transmit to base station 100 the request for switching to be a secondary donor, based on link quality between itself and base station 100 operating as the primary donor as well as device processing capability of itself. For example, when one of base stations 200B and 200C finds that the link quality between itself and base station 100 is low or the device processing capacity of its own is low, it may decide not to transmit to base station 100 the request for switching to be a secondary donor.

In step 960, after receiving the request for switching to be a secondary donor from the member nodes, base station 100 operating as the primary donor may select one from the base stations operating as member nodes that transmitted the request to become a new secondary donor. For example, base station 100 operating as the primary donor may select a base station having the best link quality with base station 100 among the base stations operating as member nodes that transmitted the request to be the new secondary donor.

In step 962, base station 100 operating as the primary donor transmits an indication signal to base station 200A operating as the original secondary donor and base station 200B selected to operate as the new secondary donor, the indication signal including information that base station 200B is selected to operate as the new secondary donor. In some embodiments of the present disclosure, the acknowledgement for switching the secondary donor in step 962 may be sent by broadcasting, so that member nodes accessing to the original secondary donor get to know that a switching of the secondary donor has occurred, and therefore synchronize with the new secondary donor and access to the new secondary donor.

In step 964, base station 200B performs configuration of a secondary donor so that it can operate as the secondary donor. For example, base station 200B enables functions of a secondary donor and disables functions that only belong to a primary donor, a member node, and a direct node. For example, base station 200B establishes a backhaul link between base station 100 operating as the primary donor and the core network, and performs downlink data distribution and uplink data aggregation through that backhaul link. For example, base station 200B allows other base stations to access to base station 200B and establish backhaul links through base station 200B. In some embodiments of the present disclosure, base station 200B may complete the configuration of the secondary donor by modifying values of corresponding fields in the configuration information.

In step 966, base station 200A performs configuration of a member node so that it can operate as the secondary donor. For example, base station 200A enables functions of a member node and disables functions that only belong to a primary donor, a secondary donor, and a direct node. For example, base station 200A establishes a backhaul link between base station 200A and the core network through the base station operating as the secondary donor, and performs downlink data distribution and uplink data aggregation through that backhaul link. For example, base station 200A does not allow other base stations to access to base station 200A and establish a backhaul link through base station 200A. For example, base station 200A initiates an intra-group access procedure to access to the base station operating as the secondary donor. In some embodiments of the present disclosure, base station 200A may complete the configuration of the member node by modifying values of to corresponding fields in the configuration information.

In some embodiments of the present disclosure, base station 200A and base station 200B exchange node identifiers. For example, the indication signal transmitted in step 962 may include a node identifier of the original secondary donor and a node identifier of the original member node that is to operate as the new secondary donor. After receiving the indication signal transmitted in step 962, base station 200A may replace the node identifier in the node identifier field in its own memory with the node identifier of the original member node. After receiving the indication signal transmitted in step 962, base station 200B may replace the node identifier in the node identifier field in its own memory with the node identifier of the original secondary donor. By exchanging the node identifiers of base station 200A and base station 200B, it is possible to easily make base station 200C, which originally accesses to base station 200A, to synchronize with base station 200B that operates as the new secondary donor and to access to base station 200B that operates as the new secondary donor.

In step 968, base station 200B operating as the new secondary donor broadcasts a synchronization signal so that user equipment or base stations operating as member nodes can search for the synchronization signal and access to base station 200B.

In step 970, base station 200A operating as the member node performs an intra-group access procedure. For example, base station 200A may search for the synchronization signal broadcast by base station 200B and access to base station 200B. Alternatively, base station 200A may search for any synchronization signal that broadcasts a synchronization sequence including a node identifier corresponding to a secondary donor, and access to a base station broadcasting that synchronization signal. For example, in a case where base station 200A receives synchronization signals from a plurality of base stations operating as secondary donors, base station 200A selects one base station from the plurality of base stations operating as secondary donors to synchronize and access to that base station. For example, in a case where base station 200A operating as the member node accesses to base station 200B operating as the secondary donor, base station 200A operating as the member node establishes a backhaul link to a backhaul network through base station 200B operating as the secondary donor and base station 100 operating as the primary donor, and performs uplink data aggregation and downlink data distribution through that backhaul link.

Figure 10:
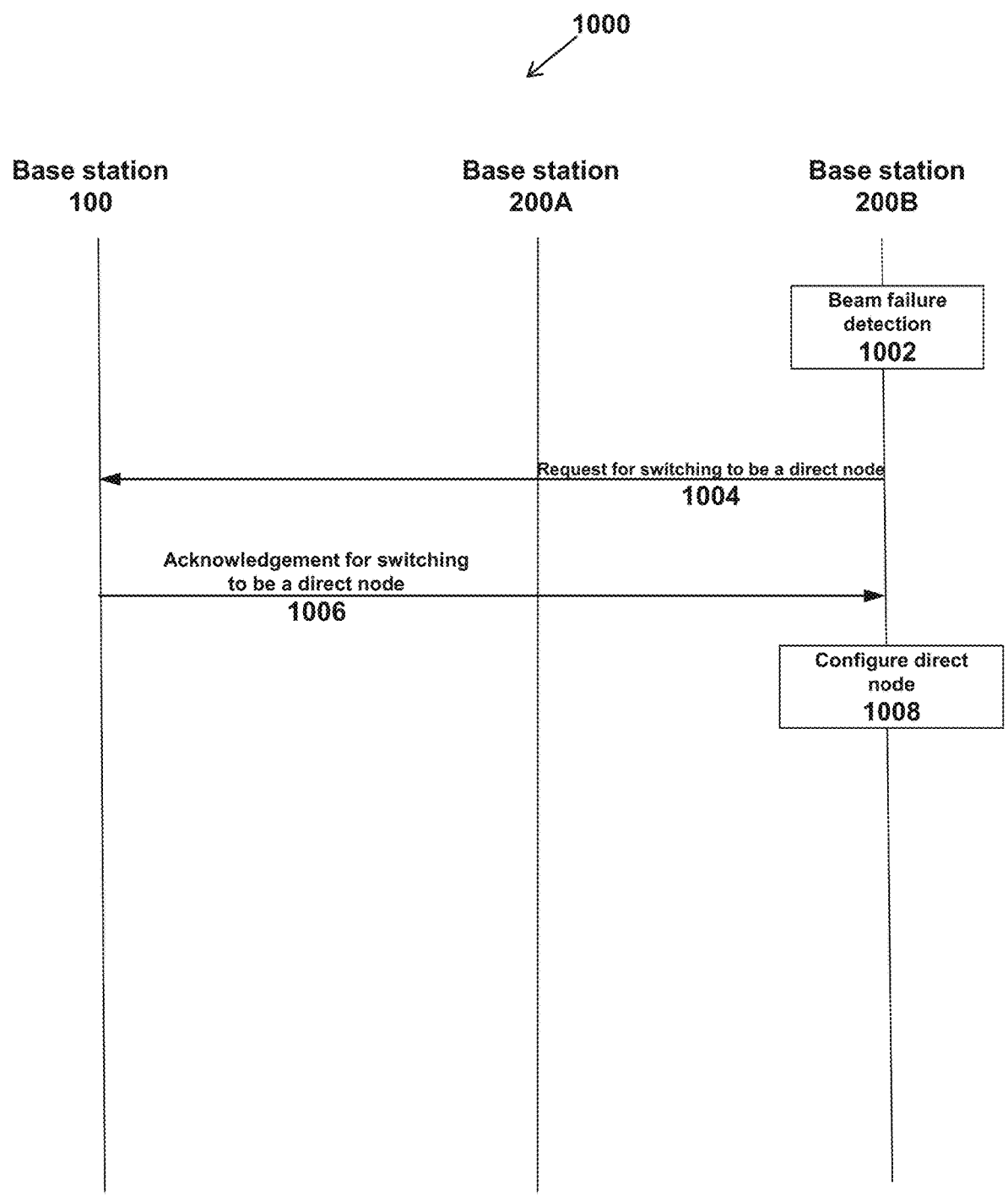
FIG. 10 illustrates a link recovery procedure for a member node in some embodiments of the disclosure.

FIG. 10 illustrates a link recovery procedure 1000 for a member node in some embodiments of the disclosure.

At step 1002, base station 200B operating as the member node detects a link failure or link quality degradation, for example, a beam between base station 200B operating as the member node and base station 200A operating as the secondary donor is blocked by a building therebetween.

In step 1004, base station 200B operating as the member node transmits to base station 100 operating as the primary donor, a request for switching to be a direct node.

In step 1006, base station 100 operating as the primary donor transmits to base station 200B operating as the member node, an acknowledgement for switching to be a direct node.

In step 1008, base station 200B performs configuration of a direct node so that it can operate as the direct node. For example, base station 200B enables functions of a direct node, and disables functions that only belong to a primary donor, a secondary donor, and a member node. For example, base station 200B establishes a backhaul link between base station 200B and the core network through base station 100 operating as the primary donor, and performs downlink data distribution and uplink data aggregation through that backhaul link. In some embodiments of the present disclosure, base station 200B may complete configuration of a direct node by modifying values of corresponding fields in the configuration information.

In some embodiments of the present disclosure, base station 100 operating as the primary donor, upon receiving a request to switch to be a direct node, assigns a node identifier in the third predefined set of identifiers to the base station that transmitted the request. For example, the indication signal transmitted in step 1006 may include an assigned node identifier in the third predefined set of identifiers to indicate the base station that transmitted the request to operate as the direct node. After receiving the indication signal transmitted in step 1006, base station 200B may replace the node identifier of the node identifier field in its memory with the assigned node identifier in the third predefined set of identifiers.

Different from the conventional methods of performing backhaul link recovery through beam switching, the link recovery method proposed by the present disclosure switches nodes in a link according to a channel state by using a network relationship between the nodes, so that the transmitting end and the receiving end can use the direct path beam with high gain for a long time, thereby improving performance of the system.

Methods for Backhaul Network

The methods performed by a primary donor, a secondary donor and a member node of the backhaul network will be described below.

Figure 11:
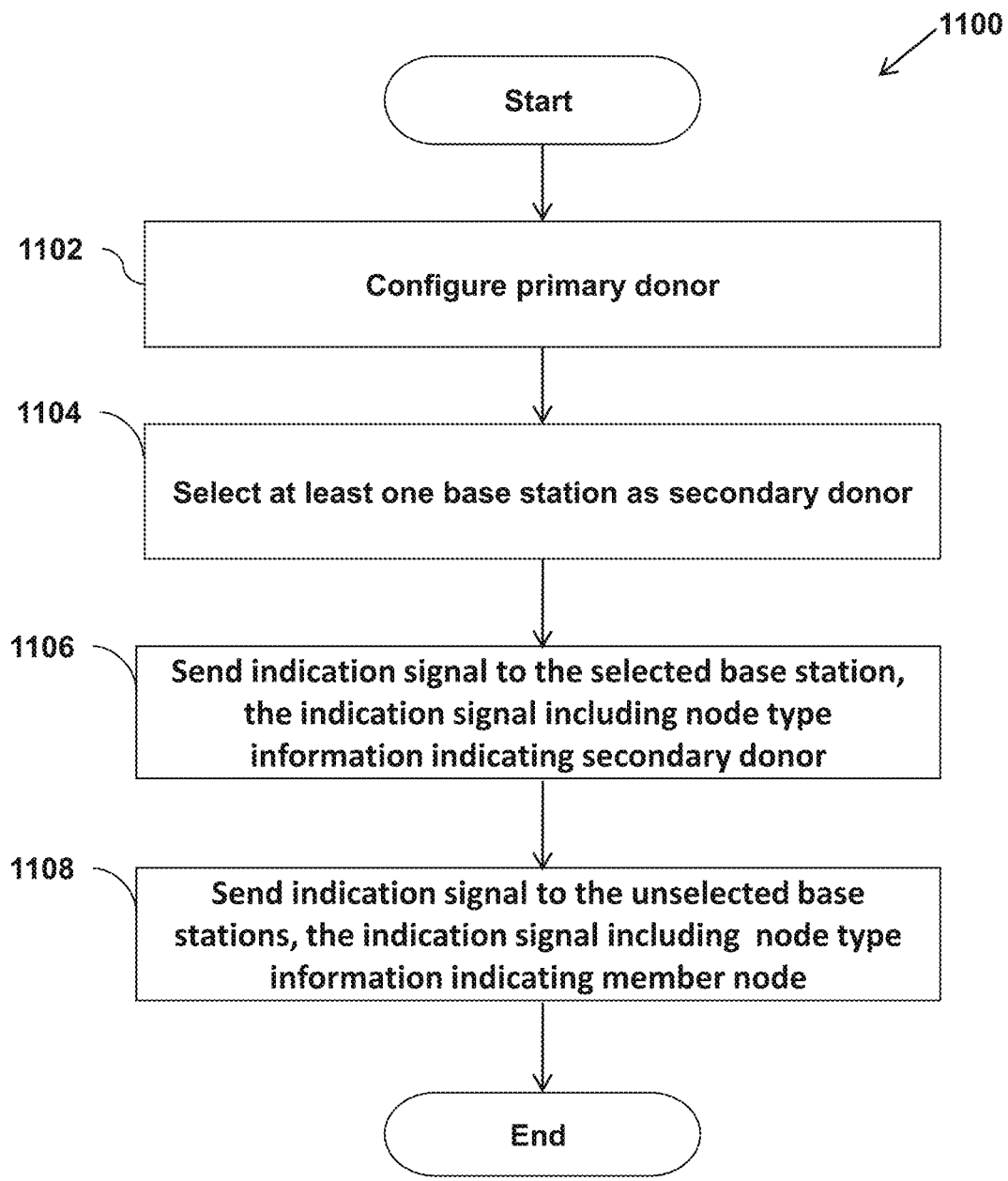
FIG. 11 illustrates a method performed by a primary donor of a backhaul network in some embodiments of the present disclosure.

FIG. 11 illustrates a method 1100 performed by a primary donor of a backhaul network of some embodiments of the present disclosure. At step 1102, configuration of a primary donor is performed by a base station (e.g., macro base station) in a backhaul network having a direct backhaul link to a core network, such that the base station can operate as the primary donor. At step 1104, at least one other base station is selected as a secondary donor. In step 1106, an indication signal is transmitted to the selected base station, the indication signal including node type information indicating a secondary donor. At step 1108, an indication signal is sent to unselected base stations, the indication signal including node type information indicating a member node. Steps 1102-1108 are steps in the initialization procedure of the backhaul network of the present disclosure. In addition, the primary donor of the backhaul network may also perform the steps in the new node joining procedure and the link recovery procedure of the present disclosure. The specific implementation of the above steps has been described in detail in the foregoing, and is not described herein again.

Figure 12:
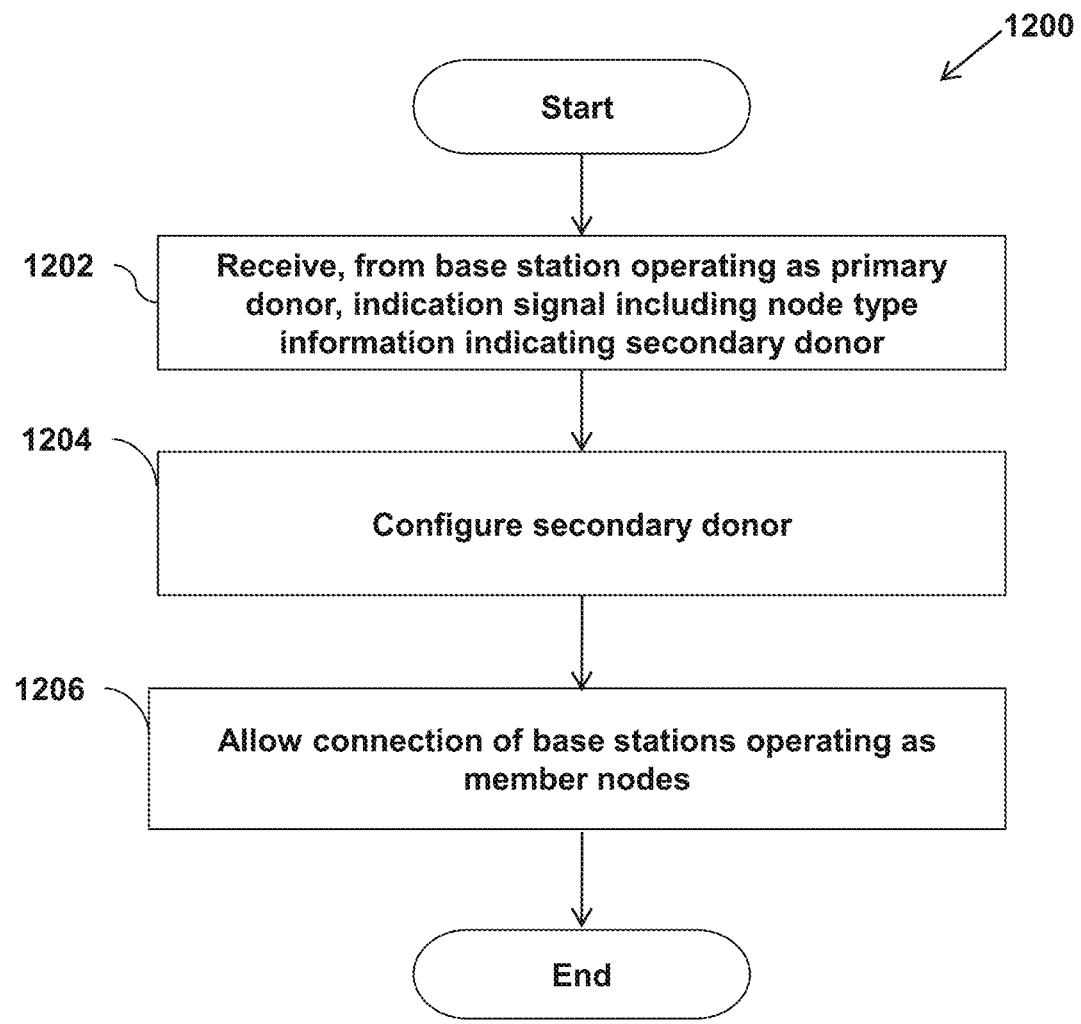
FIG. 12 illustrates a method performed by a secondary donor of the backhaul network in some embodiments of the present disclosure.

FIG. 12 illustrates a method 1200 performed by a secondary donor of a backhaul network, in some embodiments of the present disclosure. At step 1202, an indication signal is received from a base station operating as the primary donor and by a base station (e.g., a small base station) in a backhaul network that disables or does not have a direct backhaul link to a core network, the indication signal including node type information indicating a secondary donor. At step 1204, a secondary donor is configured at the base station such that the base station can operate as the secondary donor. In step 1206, connection of base stations operating as member nodes is allowed. Steps 1202-1206 are steps in the initialization procedure of the backhaul network of the present disclosure. In addition, the secondary donor of the backhaul network may also perform the steps in the new node joining procedure and the link recovery procedure of the present disclosure. The specific implementation of the above steps has been described in detail in the foregoing, and is not described herein again.

Figure 13:
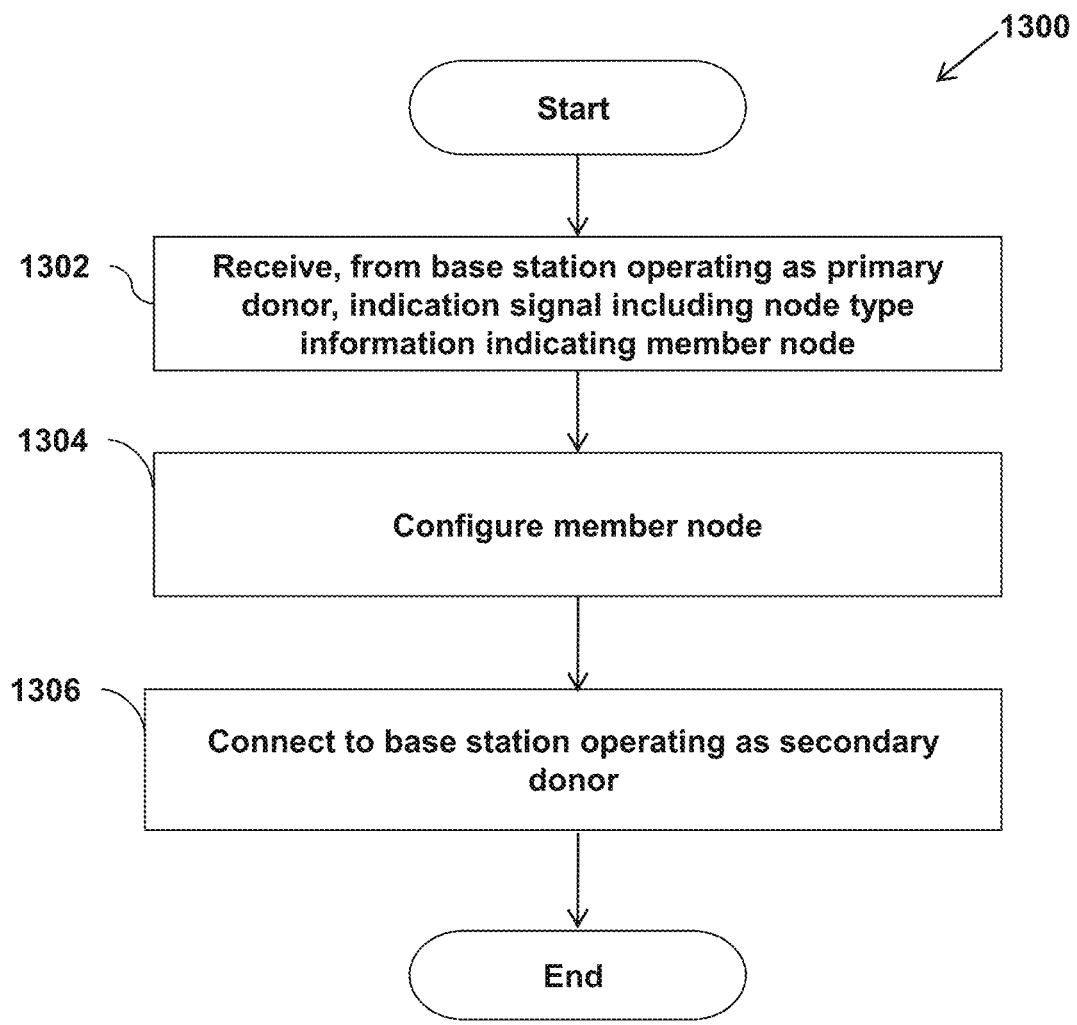
FIG. 13 illustrates a method performed by a member node of a backhaul network in some embodiments of the present disclosure.

FIG. 13 illustrates a method 1300 performed by a member node of a backhaul network, in some embodiments of the present disclosure. At step 1302, an indication signal is received from a base station operating as the primary donor and by a base station (e.g., a small base station) in the backhaul network that disables or does not have a direct backhaul link to the core network, the indication signal including node type information indicating a member node. At step 1304, configuration of the member node is performed at the base station so that the base station can operate as the member node. At step 1306, a connection is made to a base station operating as the secondary donor. Steps 1302-1306 are steps in the initialization procedure of the backhaul network of the present disclosure. In addition, the member node of the backhaul network may also perform the steps in the new node joining procedure and the link recovery procedure of the present disclosure. The specific implementation of the above steps has been described in detail in the foregoing, and is not described herein again.

<3. Simulation Results>

The present disclosure compares the system capacity of the conventional wireless backhaul network with that of the wireless backhaul network proposed by the present disclosure through simulation. The simulation parameters are shown in the following table:

| | Radius of cell | Height of antenna | Maximum number of independent beams | Antenna type |
|---|---|---|---|---|
| Macro base station (macro cell) | 1000 m | 25 m | 3 | 16 × 16 uniform planar antenna |
| Micro base station (micro cell) | 50 m | 8.5 m | 2 | 8 × 8 uniform plane antenna |

The criterion for selecting a secondary node in the simulation is set as $$i_g = \arg\max_{i \in S_g} \left( \max_{x \in X, y \in Y} |x^* H_i y| \right)$$

where y and x are beams used by the transmitting end and the receiving end respectively, Y and X are codebooks used by the transmitting end and the receiving end, respectively, and $H_i$ is a channel from the ith node to the primary donor. The normalized capacity of the conventional wireless backhaul network can be expressed as $$C_{trivial} = \frac{1}{K} \sum_{i=1}^{K} \left( \max_{x \in X, y \in Y} \frac{\sqrt{P}}{\sigma} |x^* H_i y| \right)$$

wherein K is the number of micro cells in the system, P is the transmission power of the primary donor, and $\sigma^2$ is the noise power of the receiving end. And the normalized capacity of the wireless backhaul network proposed by the present disclosure can be expressed as $$C_{proposed} = \frac{1}{G} \sum_{g=1}^{G} \left( \max_{x \in X, y \in Y} \frac{\sqrt{P}}{\sigma} |x^* H_{i_g} y| \right)$$

where G is the number of groups of the system.

The scene setting is illustrated by FIG. 5A. The simulation uses a general three-sector model. Each sector is divided into three sub-sectors of 40°, and 5 micro base stations are randomly distributed in each sub-sector, i.e., K=15, G=3.

Figure 14:
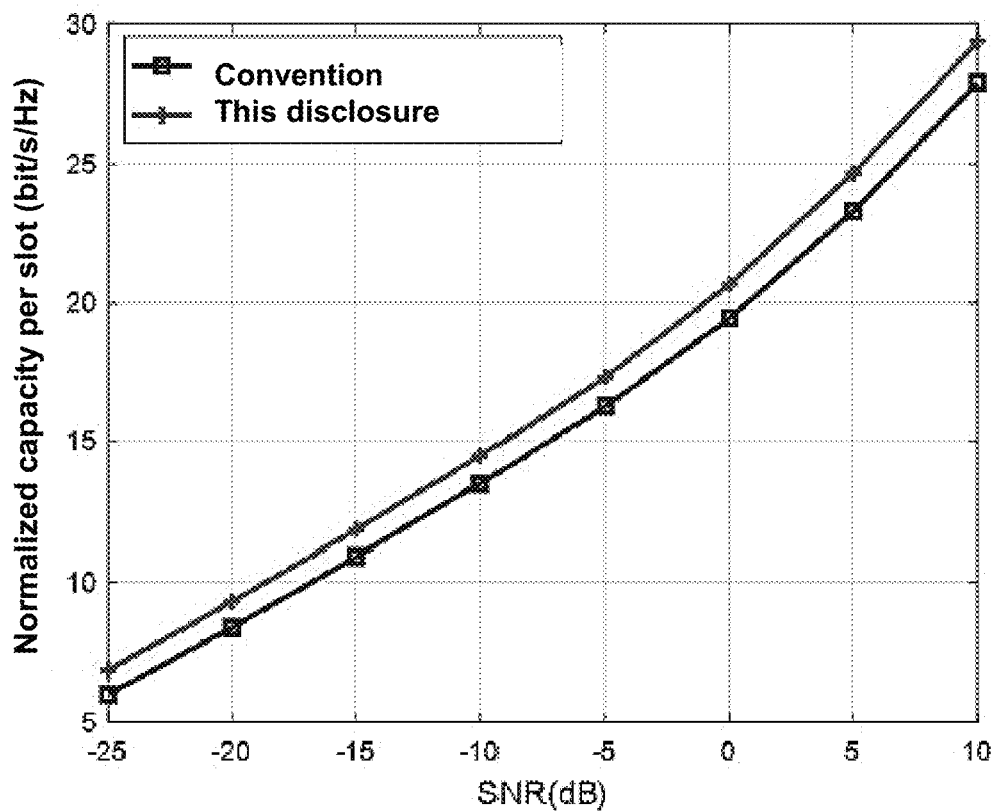
FIG. 14 illustrates simulation results of system capacity of a conventional wireless backhaul network and a wireless backhaul network proposed by the present disclosure.

FIG. 14 illustrates simulation results of system capacity of the conventional wireless backhaul network and the wireless backhaul network proposed by the present disclosure. As shown in FIG. 14, the backhaul network proposed by the present disclosure can obtain a gain in system capacity in case of allowing in-band full duplex.

<4. Application Examples>

The technology of this disclosure can be applied to a variety of products. For example, the communication apparatus 300 may be implemented as various types of computing devices.

For example, the communication apparatus 300 may be implemented as any type of evolved node B (eNB), gNB, or TRP (Transmit Receive Point), such as macro eNB/gNB and small eNB/gNB. The small eNB/gNB may be an eNB/gNB covering a cell smaller than a macro cell, such as a pico eNB/gNB, a micro eNB/gNB, and a home (femto) eNB/gNB. Alternatively, base station 100 may be implemented as any other type of base station, such as a NodeB and a Base Transceiver Station (BTS). The communication device 300 may include: a main body (also referred to as a base station apparatus) configured to control wireless communication; and one or more Remote Radio Heads (RRHs) disposed at a different place from the main body. In addition, various types of terminals, which will be described below, can each operate as the communication apparatus 300 by temporarily or semi-persistently executing the function of the base station.

For example, the communication apparatus 300 may be implemented as a mobile terminal (such as a smart phone, a tablet personal Computer (PC), a notebook PC, a portable game terminal, a portable/cryptographic dog-type mobile router, and a digital camera), or an in-vehicle terminal (such as a car navigation device). The communication device 300 may also be implemented as a terminal (also referred to as a Machine Type Communication (MTC) terminal) that performs machine-to-machine (M2M) communication. Further, the communication device 300 may be a wireless communication module (such as an integrated circuit module including a single chip) mounted on each of the above-described terminals.

[4-1. Application Examples with Respect to Computing Device]

Figure 15:
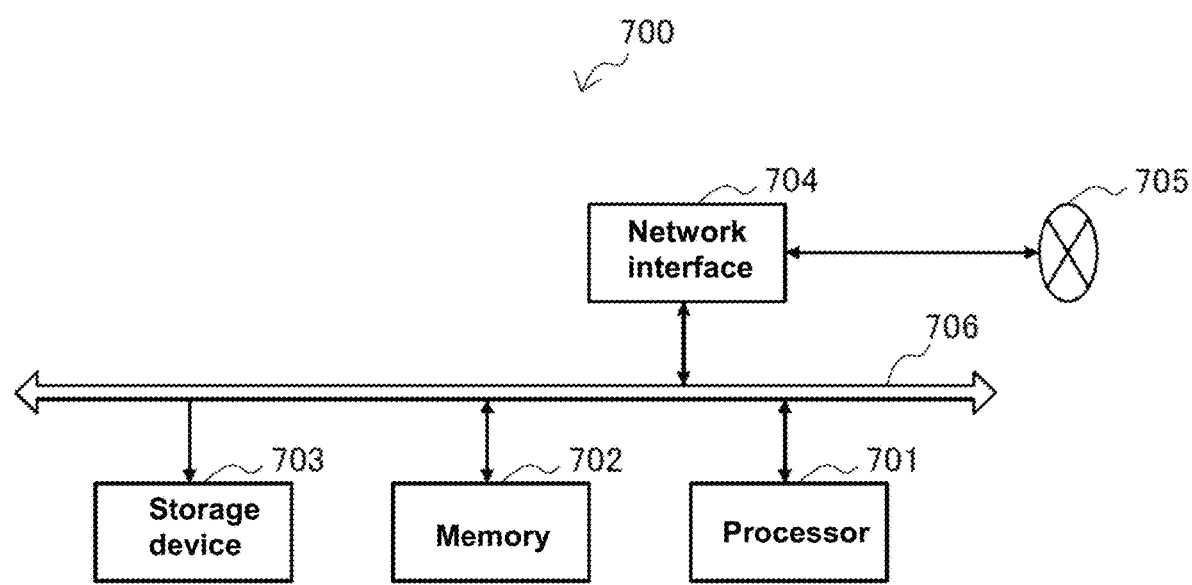
FIG. 15 is a block diagram illustrating an example of a schematic configuration of a computing device to which the technique of the present disclosure can be applied.

FIG. 15 is a block diagram illustrating an example of a schematic configuration of a computing device 700 to which the techniques of this disclosure may be applied. Computing device 700 includes a processor 701, memory 702, storage device 703, network interface 704, and bus 706.

The processor 701 may be, for example, a Central Processing Unit (CPU) or a Digital Signal Processor (DSP), and controls the functions of the server 700. The memory 702 includes a Random Access Memory (RAM) and a Read Only Memory (ROM), and stores data and programs executed by the processor 701. The storage device 703 may include a storage medium such as a semiconductor memory and a hard disk.

The network interface 704 is a wired communication interface for connecting the server 700 to a wired communication network 705. The wired communication network 705 may be a core network such as an Evolved Packet Core (EPC) or a Packet Data Network (PDN) such as the internet.

The bus 706 connects the processor 701, the memory 702, the storage device 703, and the network interface 704 to each other. The bus 706 may include two or more buses, each having a different speed (such as a high-speed bus and a low-speed bus).

[4-2. Application Examples on the Base Station]

First Application Example

Figure 16:
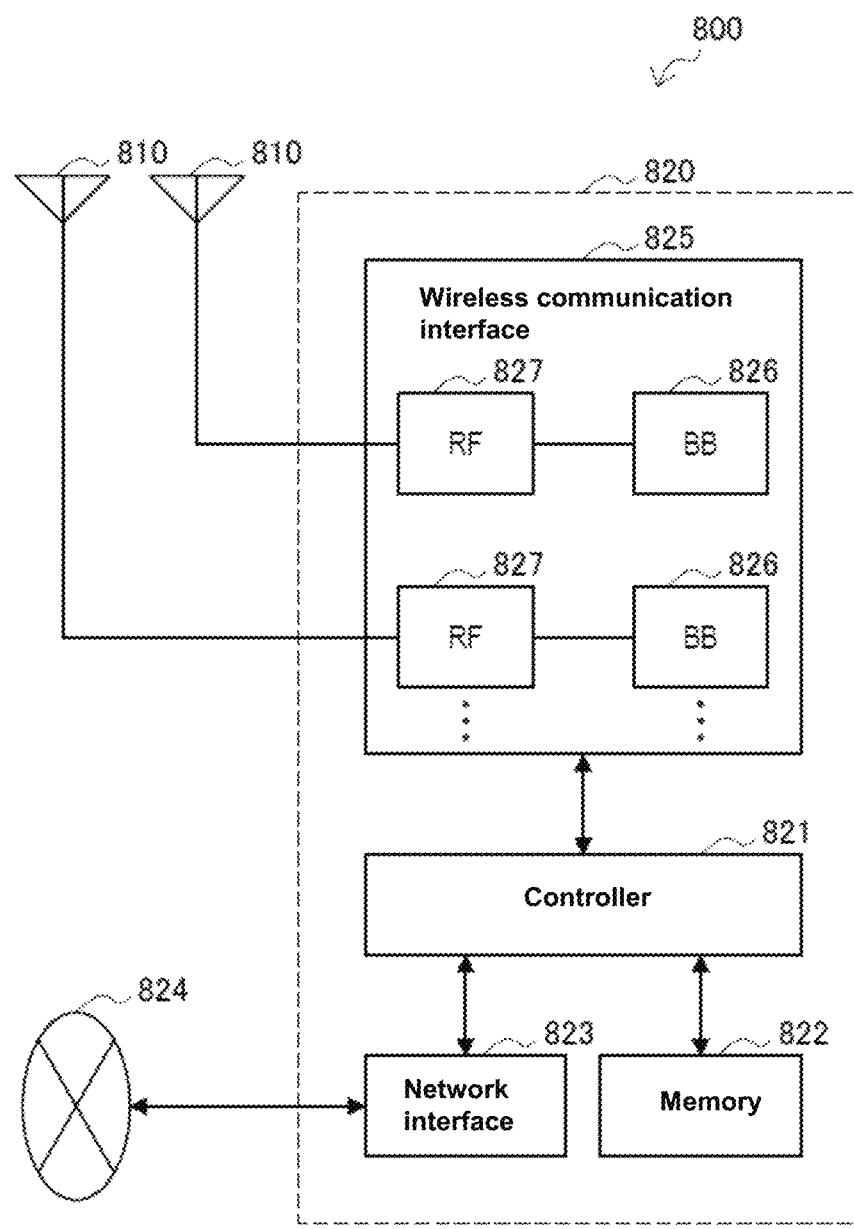
FIG. 16 is a block diagram illustrating a first example of a schematic configuration of an eNB to which the technique of the present disclosure can be applied.

FIG. 16 is a block diagram illustrating a first example of a schematic configuration of an eNB to which the technology of the present disclosure can be applied. The eNB 800 includes one or more antennas 810 and a base station device 820. The base station device 820 and each antenna 810 may be connected to each other via an RF cable.

Each of the antennas 810 includes a single or multiple antenna elements, such as multiple antenna elements included in a multiple-input multiple-output (MIMO) antenna, and is used for the base station apparatus 820 to transmit and receive wireless signals. As shown in FIG. 16, eNB 800 may include multiple antennas 810. For example, the multiple antennas 810 may be compatible with multiple frequency bands used by the eNB 800. Although FIG. 16 illustrates an example in which the eNB 800 includes multiple antennas 810, the eNB 800 may also include a single antenna 810.

The base station apparatus 820 comprises a controller 821, a memory 822, a network interface 823 and a wireless communication interface 825.

The controller 821 may be, for example, a CPU or a DSP, and operates various functions of the higher layers of the base station apparatus 820. For example, the controller 821 generates a data packet from data in a signal processed by the wireless communication interface 825 and transfers the generated packet via the network interface 823. The controller 821 may bundle data from the plurality of baseband processors to generate a bundle packet and deliver the generated bundle packet. The controller 821 may have a logic function to perform the following control: such as radio resource control, radio bearer control, mobility management, admission control and scheduling. The control may be performed in connection with a nearby eNB or core network node. The memory 822 includes a RAM and a ROM, and stores programs executed by the controller 821 and various types of control data (such as a terminal list, transmission power data, and scheduling data).

The network interface 823 is a communication interface for connecting the base station device 820 to a core network 824. The controller 821 may communicate with a core network node or another eNB via a network interface 823. In this case, the eNB 800 and a core network node or another eNB may be connected to each other through a logical interface, such as an S1 interface and an X2 interface. The network interface 823 may also be a wired communication interface or a wireless communication interface for a wireless backhaul. If the network interface 823 is a wireless communication interface, network interface 823 may use a higher frequency band for wireless communication than the frequency band used by wireless communication interface 825.

The wireless communication interface 825 supports any cellular communication scheme, such as Long Term Evolution (LTE) and LTE-advanced, and provides wireless connectivity to terminals located in the cell of the eNB 800 via the antenna 810. The wireless communication interface 825 may generally include, for example, a baseband (BB) processor 826 and RF circuitry 827. The BB processor 826 may perform, for example, encoding/decoding, modulation/demodulation, and multiplexing/demultiplexing, and perform various types of signal processing of layers such as L1, Medium Access Control (MAC), Radio Link Control (RLC), and Packet Data Convergence Protocol (PDCP). In place of the controller 821, the BB processor 826 may have part or all of the above-described logic functions. The BB processor 826 may be a memory storing a communication control program, or a module comprising a processor configured to execute a program and associated circuitry. The update program may cause the function of BB processor 826 to change. The module may be a card or blade that is inserted into a slot of the base station device 820. Alternatively, the module may be a chip mounted on a card or blade. Meanwhile, the RF circuit 827 may include, for example, a mixer, a filter, and an amplifier, and transmits and receives a wireless signal via the antenna 810.

As shown in FIG. 16, wireless communication interface 825 may include a plurality of BB processors 826. For example, the plurality of BB processors 826 may be compatible with multiple frequency bands used by eNB 800. As shown in FIG. 16, wireless communication interface 825 may include a plurality of RF circuits 827. For example, the plurality of RF circuits 827 may be compatible with a plurality of antenna elements. Although FIG. 16 illustrates an example in which the wireless communication interface 825 includes a plurality of BB processors 826 and a plurality of RF circuits 827, the wireless communication interface 825 may include a single BB processor 826 or a single RF circuit 827.

Second Application Example

Figure 17:
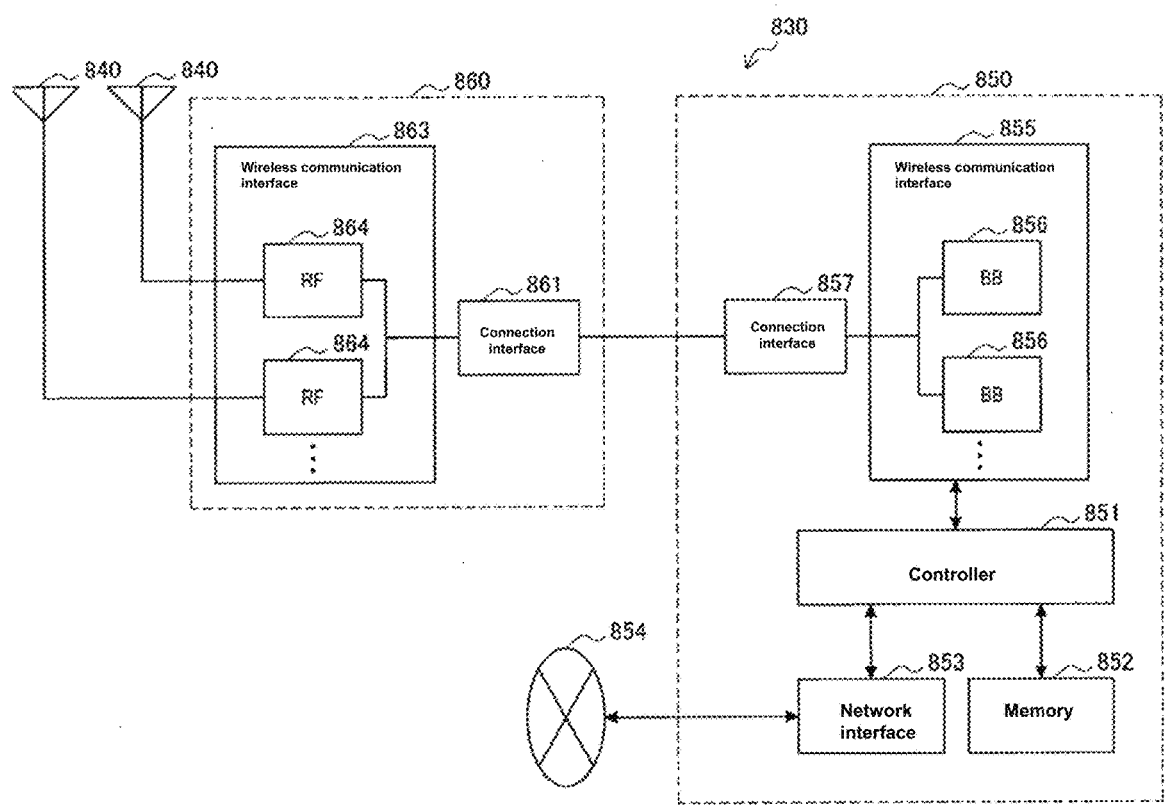
FIG. 17 is a block diagram illustrating a second example of a schematic configuration of an eNB to which the technique of the present disclosure may be applied.

FIG. 17 is a block diagram illustrating a second example of a schematic configuration of an eNB to which the technology of the present disclosure may be applied. eNB 830 includes one or more antennas 840, a base station device 850, and a RRH 860. The RRH 860 and each antenna 840 may be connected to each other via an RF cable. The base station device 850 and the RRH 860 may be connected to each other via a high-speed line such as a fiber optic cable.

Each of the antennas 840 includes a single or multiple antenna elements (such as a plurality of antenna elements included in a MIMO antenna) and is used for transmitting and receiving wireless signals by the RRH 860. As shown in FIG. 17, the eNB 830 may include multiple antennas 840. For example, the plurality of antennas 840 may be compatible with multiple frequency bands used by the eNB 830. Although FIG. 17 illustrates an example in which the eNB 830 includes multiple antennas 840, the eNB 830 may also include a single antenna 840.

Base station apparatus 850 comprises a controller 851, memory 852, a network interface 853, a wireless communication interface 855, and a connection interface 857. The controller 851, the memory 852 and the network interface 853 are the same as the controller 821, the memory 822 and the network interface 823 described with reference to FIG. 16.

Wireless communication interface 855 supports any cellular communication scheme (such as LTE and LTE-advanced) and provides wireless communication via RRH 860 and antenna 840 to terminals located in a sector corresponding to RRH 860. The wireless communication interface 855 generally includes, for example, a BB processor 856. The BB processor 856 is identical to the BB processor 826 described with reference to FIG. 16, except that the BB processor 856 is connected to the RF circuitry 864 of the RRH 860 via a connection interface 857. As shown in FIG. 17, the wireless communication interface 855 may comprise a plurality of BB processors 856. For example, the plurality of BB processors 856 may be compatible with multiple frequency bands used by eNB 830. Although FIG. 17 illustrates an example in which the wireless communication interface 855 comprises a plurality of BB processors 856, the wireless communication interface 855 may also comprise a single BB processor 856.

Connection interface 857 is an interface for connecting the base station device 850 (wireless communication interface 855) to the RRH 860. The connection interface 857 may also be a communication module for communication in the above-described high-speed line that connects the base station device 850 (wireless communication interface 855) to the RRH 860.

RRH 860 includes a connection interface 861 and a wireless communication interface 863.

The connection interface 861 is an interface for connecting the RRH 860 (wireless communication interface 863) to the base station apparatus 850. The connection interface 861 may also be a communication module for communication in the above-described high-speed line.

The wireless communication interface 863 transmits and receives wireless signals via antenna 840. The wireless communication interface 863 usually includes RF circuitry 864, for example. The RF circuit 864 may include, for example, a mixer, a filter, and an amplifier, and transmits and receives a wireless signal via the antenna 840. As shown in FIG. 17, wireless communication interface 863 may include a plurality of RF circuits 864. For example, the plurality of RF circuits 864 may support multiple antenna elements. Although FIG. 17 illustrates an example in which the wireless communication interface 863 includes a plurality of RF circuits 864, the wireless communication interface 863 may also include a single RF circuit 864.

[4-3. Application Example on Terminal Devices]

First Application Example

Figure 18:
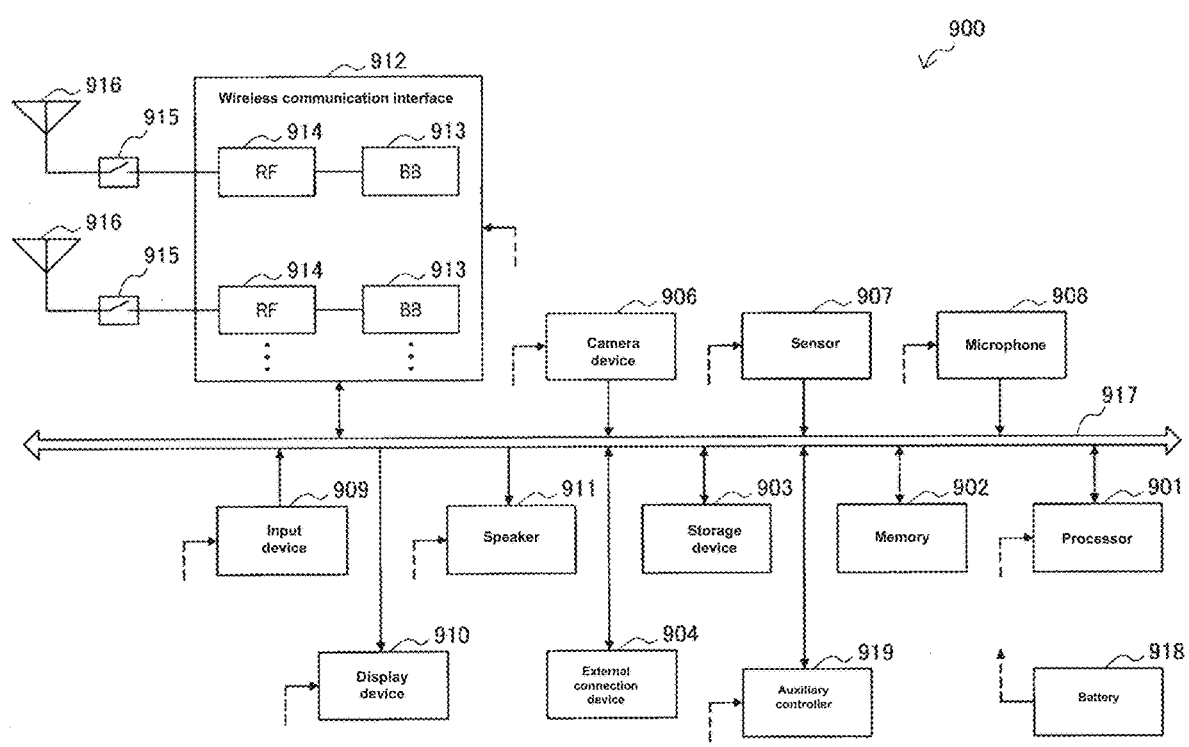
FIG. 18 is a block diagram illustrating an example of a schematic configuration of a smartphone to which the technique of the present disclosure can be applied.

FIG. 18 is a block diagram illustrating an example of a schematic configuration of a smartphone 900 to which the technology of the present disclosure can be applied. The smartphone 900 includes a processor 901, a memory 902, a storage device 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smart phone 900. The memory 902 includes a RAM and a ROM, and stores data and programs executed by the processor 901. The storage device 903 may include a storage medium such as a semiconductor memory and a hard disk. The external connection interface 904 is an interface for connecting an external device such as a memory card and a Universal Serial Bus (USB) device to the smartphone 900.

The camera 906 includes an image sensor such as a Charge Coupled Device (CCD) and a Complementary Metal Oxide Semiconductor (CMOS), and generates a captured image. The sensor 907 may include a set of sensors such as a measurement sensor, a gyro sensor, a geomagnetic sensor, and an acceleration sensor. The microphone 908 converts sound input to the smart phone 900 into an audio signal. The input device 909 includes, for example, a touch sensor, a keypad, a keyboard, buttons, or switches configured to detect a touch on the screen of the display device 910, and receives an operation or information input from a user. The display device 910 includes a screen, such as a Liquid Crystal Display (LCD) and an Organic Light Emitting Diode (OLED) display, and displays an output image of the smart phone 900. The speaker 911 converts an audio signal output from the smart phone 900 into sound.

The wireless communication interface 912 supports any cellular communication scheme (such as LTE and LTE-advanced) and performs wireless communication. The wireless communication interface 912 may generally include, for example, a BB processor 913 and RF circuitry 914. The BB processor 913 can perform, for example, encoding/decoding, modulation/demodulation, and multiplexing/demultiplexing, and perform various types of signal processing for wireless communication. Meanwhile, the RF circuit 914 may include, for example, a mixer, a filter, and an amplifier, and transmits and receives a wireless signal via the antenna 916. The wireless communication interface 912 may be one chip module on which the BB processor 913 and the RF circuit 914 are integrated. As shown in FIG. 18, the wireless communication interface 912 may include a plurality of BB processors 913 and a plurality of RF circuits 914. Although FIG. 18 illustrates an example in which the wireless communication interface 912 includes a plurality of BB processors 913 and a plurality of RF circuits 914, the wireless communication interface 912 may also include a single BB processor 913 or a single RF circuit 914.

Further, the wireless communication interface 912 may support another type of wireless communication scheme, such as a short-range wireless communication scheme, a near field communication scheme, and a wireless Local Area Network (LAN) scheme, in addition to the cellular communication scheme. In this case, the wireless communication interface 912 may include a BB processor 913 and an RF circuit 914 for each wireless communication scheme.

Each of the antenna switches 915 switches a connection destination of the antenna 916 among a plurality of circuits (for example, circuits for different wireless communication schemes) included in the wireless communication interface 912.

Each of the antennas 916 includes a single or multiple antenna elements (such as multiple antenna elements included in a MIMO antenna) and is used for transmitting and receiving wireless signals by the wireless communication interface 912. As shown in FIG. 18, the smartphone 900 may further include multiple antennas 916. Although FIG. 18 illustrates an example in which the smartphone 900 includes multiple antennas 916, the smartphone 900 may also include a single antenna 916.

Further, the smartphone 900 may include an antenna 916 for each wireless communication scheme. In this case, the antenna switch 915 may be omitted from the configuration of the smartphone 900.

The bus 917 connects the processor 901, the memory 902, the storage device 903, the external connection interface 904, the camera 906, the sensor 907, the microphone 908, the input device 909, the display device 910, the speaker 911, the wireless communication interface 912, and the auxiliary controller 919 to each other. The battery 918 provides power to the various blocks of the smartphone 900 shown in FIG. 18 via a feed line, which is partially shown in the figure as a dashed line. The auxiliary controller 919 operates the minimum necessary functions of the smart-phone 900, for example, in a sleep mode.

Second Application Example

Figure 19:
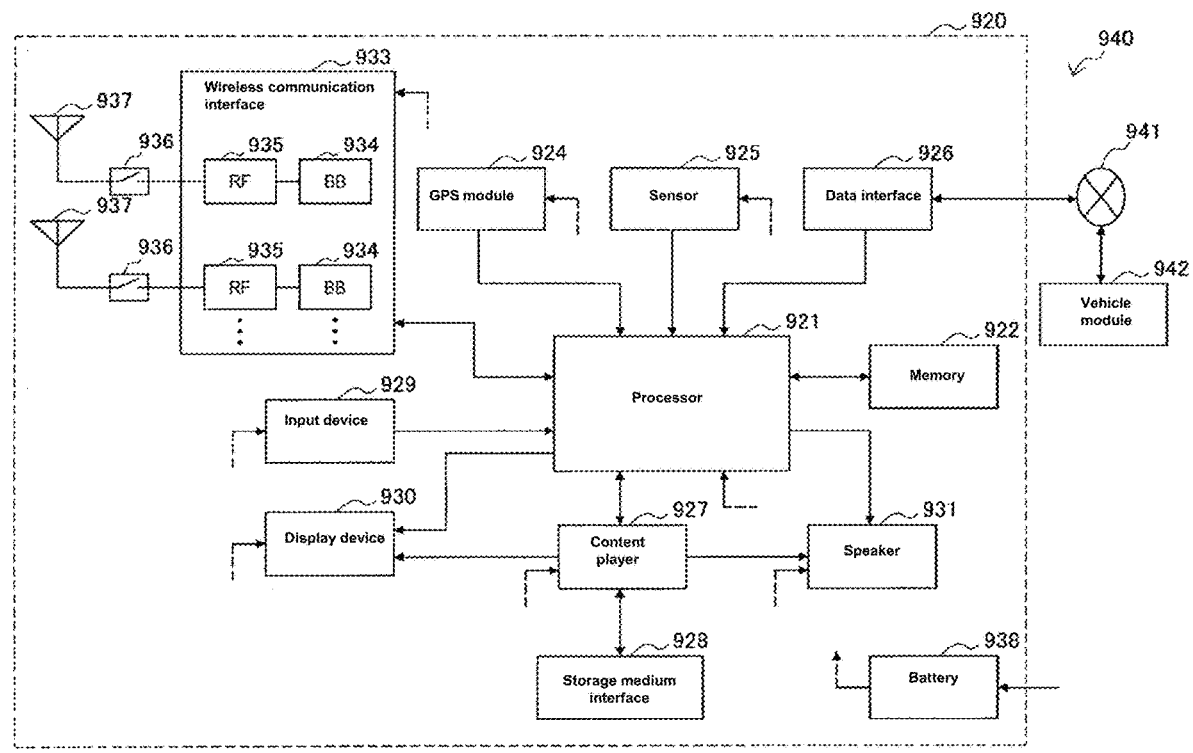
FIG. 19 is a block diagram illustrating an example of a schematic configuration of a vehicle navigation device to which the technique of the present disclosure can be applied.

FIG. 19 is a block diagram illustrating an example of a schematic configuration of a car navigation device 920 to which the technology of the present disclosure can be applied. The car navigation device 920 includes a processor 921, memory 922, a Global Positioning System (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or a SoC, and controls the navigation function and other functions of the car navigation device 920. The memory 922 includes a RAM and a ROM, and stores data and programs executed by the processor 921.

The GPS module 924 measures the position (such as latitude, longitude, and altitude) of the car navigation device 920 using GPS signals received from GPS satellites. The sensors 925 may include a set of sensors such as a gyro sensor, a geomagnetic sensor, and an air pressure sensor. The data interface 926 is connected to, for example, an in-vehicle network 941 via a terminal not shown, and acquires data generated by a vehicle (such as vehicle speed data).

The content player 927 reproduces content stored in a storage medium (such as a CD and a DVD) inserted into the storage medium interface 928. The input device 929 includes, for example, a touch sensor, a button or a switch configured to detect a touch on the screen of the display device 930, and receives an operation or information input from a user. The display device 930 includes a screen such as an LCD or an OLED display, and displays an image of a navigation function or reproduced content. The speaker 931 outputs the sound of the navigation function or the reproduced content.

The wireless communication interface 933 supports any cellular communication scheme (such as LTE and LTE-advanced) and performs wireless communication. Wireless communication interface 933 can generally include, for example, BB processor 934 and RF circuitry 935. The BB processor 934 may perform, for example, encoding/decoding, modulation/demodulation, and multiplexing/demultiplexing, and perform various types of signal processing for wireless communication. Meanwhile, the RF circuit 935 may include, for example, a mixer, a filter, and an amplifier, and transmit and receive a wireless signal via the antenna 937. The wireless communication interface 933 can also be a chip module having the BB processor 934 and the RF circuitry 935 integrated thereon. As shown in FIG. 19, wireless communication interface 933 can include multiple BB processors 934 and multiple RF circuits 935. Although FIG. 19 illustrates an example in which the wireless communication interface 933 includes multiple BB processors 934 and multiple RF circuits 935, the wireless communication interface 933 may also include a single BB processor 934 or a single RF circuit 935.

Further, the wireless communication interface 933 may support another type of wireless communication scheme, such as a short-range wireless communication scheme, a near field communication scheme and a wireless LAN scheme, in addition to the cellular communication scheme. In this case, THE wireless communication interface 933 can include BB processor 934 and RF circuitry 935 for each wireless communication scheme.

Each of the antenna switches 936 switches a connection destination of the antenna 937 between a plurality of circuits (such as circuits for different wireless communication schemes) included in the wireless communication interface 933.

Each of the antennas 937 includes a single or multiple antenna elements (such as multiple antenna elements included in a MIMO antenna), and is used for transmitting and receiving wireless signals by the wireless communication interface 933. As shown in FIG. 19, the car navigation device 920 may include a plurality of antennas 937. Although FIG. 19 illustrates an example in which the car navigation device 920 includes a plurality of antennas 937, the car navigation device 920 may include a single antenna 937.

Further, the car navigation device 920 may include an antenna 937 for each wireless communication scheme. In this case, the antenna switch 936 may be omitted from the configuration of the car navigation device 920.

A battery 938 provides power to the various blocks of the car navigation device 920 shown in FIG. 19 via a feed line, which is partially shown in the figure as a dashed line. The battery 938 accumulates power supplied from the vehicle.

The technology of this disclosure may also be implemented as an in-vehicle system (or vehicle) 940 including one or more of the blocks of the car navigation device 920, the in-vehicle network 941, and the vehicle module 942. The vehicle module 942 generates vehicle data (such as vehicle speed, engine speed, and failure information), and outputs the generated data to the on-board network 941.

The various illustrative blocks and components described in connection with the present disclosure may be implemented or performed by a general purpose processor, a Digital Signal Processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, a plurality of microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, in view of the nature of software, the functions described above may be performed using software executed by a processor, hardware, firmware, hardwiring, or a combination of any of these. Features that implement a function may also be physically located at various positions, including being distributed such that portions of the function are implemented at different physical locations.

In addition, the disclosure of components contained within or separate from other components should be considered exemplary, as a variety of other architectures can potentially be implemented to achieve the same functionality, including incorporation of all, most, and/or some elements as part of one or more unitary or separate structures.

Non-transitory computer readable media can be any available non-transitory media that can be accessed by a general purpose or special purpose computer. By way of example, and not limitation, non-transitory computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed.

Some embodiments of the disclosure may also be configured as follows:

1. An electronic device for a backhaul network, wherein the backhaul network comprises a first communication apparatus connected to a core network and a plurality of second communication apparatuses performing wireless communication with the first communication apparatus, the electronic device comprising:
    processing circuitry configured to perform control to cause the first communication apparatus comprising the electronic device to:
        operate as a primary donor;
        select at least one second communication apparatus of the plurality of second communication apparatuses as a secondary donor;
        transmit a first indication signal to the selected at least one second communication apparatus, the first indication signal comprising node type information indicating the secondary donor;
        transmit a second indication signal to second communication apparatuses that are not selected, the second indication signal comprising node type information indicating a member node;
    wherein the primary donor establishes a direct backhaul link to the core network, the secondary donor establishes a backhaul link to the core network through the primary donor, and the member node establishes a backhaul link to the core network through the secondary donor and the primary donor.

2. The electronic device according to claim 1, wherein selecting the at least one second communication apparatus of the plurality of second communication apparatuses as the secondary donor comprises: grouping the plurality of second communication apparatuses into at least one group, and selecting one second communication apparatus in each group as the secondary donor.

3. The electronic device according to Item 2, wherein grouping the plurality of second communication apparatuses into the at least one group comprises one of:
    grouping second communication apparatuses with adjacent geographical positions into a same group; or
    applying a clustering algorithm or a binary recursive algorithm to channel information of the plurality of second communication apparatuses, so as to group the plurality of second communication apparatuses into the at least one group.

4. The electronic device according to Item 2, wherein selecting one second communication apparatus in each group as the secondary donor comprises one of:

selecting a second communication apparatus with the greatest reception power gain in the group as the secondary donor; or selecting a second communication apparatus with a channel state that is closest to an average channel state of the group as the secondary donor.

5. The electronic device according to Item 1, wherein selecting the at least one second communication apparatus of the plurality of second communication apparatuses as the secondary donor comprises:

selecting a predetermined number of second communication apparatuses as the secondary donor, such that a reception power gain of each of the selected second communication apparatuses is higher than a reception power gain of each of second communication apparatuses that are not selected.

6. The electronic device according to Item 1, wherein the processing circuitry is further configured to perform control to cause the first communication apparatus to:

assign an identifier of a first predefined set of identifiers to the secondary donor, and include the identifier assigned to the secondary donor in the first indication signal; and assign an identifier of a second predefined set of identifiers to the member node, and include the identifier assigned to the member node in the second indication signal, wherein the first predefined set of identifiers and the second predefined set of identifiers do not comprise a default identifier for the primary donor and do not comprise a common identifier.

7. The electronic device according to Item 6, wherein the processing circuitry is further configured to perform control to cause the first communication apparatus to: broadcast a synchronization signal that corresponds to the default identifier.

8. The electronic device according to Item 1, wherein the processing circuitry is further configured to perform control to cause the first communication apparatus to:

transmit the second indication signal to a communication apparatus newly joined the backhaul network; and transmit a third indication signal to the newly joined communication apparatus, wherein the third indication signal comprises an identifier for the secondary donor to which the newly joined communication apparatus is recommended to connect.

9. The electronic device according to Item 1, wherein the processing circuitry is further configured to perform control to cause the first communication apparatus to:

in response to receiving from member nodes a request for switching the secondary donor, select a new secondary donor from the member nodes that transmit the request, and transmit an acknowledgement for switching the secondary donor.

10. The electronic device according to Item 1, wherein the processing circuitry is further configured to perform control to cause the first communication apparatus to:

in response to receiving from member nodes a request for switching to be a direct node, transmitting to the member nodes that transmit the request an acknowledgement for switching to be a direct node, wherein the direct node establishes a backhaul link to the core network through the primary donor.

11. The electronic device according to Item 1, wherein the processing circuitry is further configured to perform control to cause the first communication apparatus to:

maintain a connection that is in an RRC_INACTIVE state with the member node.

12. The electronic device according to Item 1, wherein the first communication device and the plurality of second communication devices are base stations.

13. An electronic device for a backhaul network, wherein the backhaul network comprises a first communication apparatus connected to a core network and a plurality of second communication apparatuses performing wireless communication with the first communication apparatus, the electronic device comprising:

processing circuitry configured to perform control to cause a second communication apparatus of the plurality of second communication apparatuses comprising the electronic device to:

receive a first indication signal from a first communication apparatus that operates as a primary donor, the first indication signal including node type information indicating a secondary donor;

in response to receiving the first indication signal, operate as a secondary donor; and allow connection to a second communication apparatus of the plurality of second communication apparatuses that operates as a member node, wherein the primary donor establishes a direct backhaul link to the core network, the secondary donor establishes a backhaul link to the core network through the primary donor, and the member node establishes a backhaul link to the core network through the secondary donor and the primary donor.

14. The electronic device according to Item 13, wherein, the first indication signal received from the primary donor further comprises an identifier assigned to the secondary donor, said identifier assigned to the secondary donor being in a first predefined set of identifiers which does not include a default identifier for the primary donor, and the processing circuitry is further configured to perform control to cause the second communication apparatus including the electronic device to: broadcast a synchronization signal that corresponds to the identifier assigned to the secondary donor.

15. The electronic device according to Item 13, wherein the processing circuitry is further configured to perform control to cause the second communication apparatus comprising the electronic device to:

when quality degradation of the backhaul link is detected, transmit to a member node that is connected to the secondary donor a request for switching a secondary donor;

in response to receiving from the primary donor an acknowledgement for switching the secondary donor, switch from being the secondary donor to be a member node.

16. The electronic device according to Item 15, wherein switching from being the secondary donor to be a member node comprises: exchanging identifiers with a member node that is selected as the new secondary donor.

17. The electronic device according to Item 13, wherein the first communication apparatus and the plurality of second communication apparatuses are base stations.

18. An electronic device for a backhaul network, wherein the backhaul network comprises a first communication apparatus connected to a core network and a plurality of second communication apparatuses performing wireless communication with the first communication apparatus, the electronic device comprising:

processing circuitry configured to perform control to cause the second communication apparatus including the electronic device to:

receive a second indication signal from a first communication apparatus that operates as a primary donor, the second indication signal including node type information indicating a member node; and in response to receiving the second indication signal, operate as a member node and connect to a second communication apparatus of the plurality of second communication devices that operates as a secondary donor, wherein the primary donor establishes a direct backhaul link with the core network, the secondary donor establishes a backhaul link to the core network through the primary donor, and the member node establishes a backhaul link to the core network through the secondary donor and the primary donor.

19. The electronic device according to Item 18, wherein,
the second indication signal received from the primary donor includes an identifier of a secondary donor to which the member node is to be connected, and the secondary donor having the identifier is connected.

20. The electronic device according to Item 18, wherein the processing circuitry is further configured to perform control to cause the second communications apparatus comprising the electronic device to:

detect a synchronization signal that corresponds to an identifier in a first predefined set of identifiers; and connect to the secondary donor that transmits the synchronization signal.

21. The electronic device according to Item 18, wherein
the second indication signal received from the primary donor further includes an identifier assigned to the member node, the identifier assigned to the member node being in a second predefined set of identifiers, wherein the second predefined set of identifiers does not include a default identifier for the primary donor and does not include a common identifier with the first predefined set of identifiers for the secondary donor, and the processing circuitry is further configured to perform control to cause the second communication apparatus including the electronic device to: broadcast a synchronization signal that corresponds to the identifier assigned to the member node.

22. The electronic device according to Item 18, wherein the processing circuitry is further configured to perform control to cause the second communication apparatus comprising the electronic device to:

in response to receiving from a secondary donor to which the member node is connected a request for switching the secondary donor, transmit to the primary donor a request for switching the secondary donor;

in response to receiving from the primary donor an acknowledgement for switching the secondary donor, perform one of:

exchanging identifiers with the secondary donor to which it is connected and switching from being the member node to be a new secondary donor, and connecting to a new secondary donor.

23. The electronic device according to Item 18, wherein the processing circuitry is further configured to perform control to cause the second communication apparatus comprising the electronic device to:

when quality degradation of the backhaul link is detected, send to the primary donor a request for switching to be a direct node;

in response to receiving from the primary donor an acknowledgement for switching to be a direct node, switch from being the member node to be the direct node, wherein the direct node establishes a backhaul link to the core network through the primary donor.

24. The electronic device according to Item 18, wherein the processing circuitry is further configured to perform control to cause the second communication apparatus comprising the electronic device to:

when operating as the member node, maintain a connection that is in an RRC_INACTIVE state with the primary donor.

25. The electronic device according to Item 18, wherein the first communication apparatus and the plurality of second communication apparatuses are base stations.

26. A base station comprising the electronic device of any one of Items 1-25.

27. A method for a backhaul network, wherein the backhaul network comprises a first communication apparatus connected to a core network and a plurality of second communication apparatuses performing wireless communication with the first communication apparatus, the method comprising causing the first communication apparatus to:

operate as a primary donor;

select at least one second communication apparatus of the plurality of second communication apparatuses as a secondary donor;

transmit a first indication signal to the selected at least one second communication apparatus, the first indication signal comprising node type information indicating the secondary donor;

transmit a second indication signal to second communication apparatuses that are not selected, the second indication signal comprising node type information indicating a member node;

wherein the primary donor establishes a direct backhaul link to the core network, the secondary donor establishes a backhaul link to the core network through the primary donor, and the member node establishes a backhaul link to the core network through the secondary donor and the primary donor.

28. A method for a backhaul network, wherein the backhaul network comprises a first communication apparatus connected to a core network and a plurality of second communication apparatuses performing wireless communication with the first communication apparatus, the method comprising causing at least one second communication apparatus of the plurality of second communication apparatuses to:

receive a first indication signal from a first communication apparatus that operates as a primary donor, the first indication signal including node type information indicating a secondary donor;

in response to receiving the first indication signal, operate as a secondary donor; and allow connection to a second communication apparatus of the plurality of second communication apparatuses that operates as a member node, wherein the primary donor establishes a direct backhaul link to the core network, the secondary donor establishes a backhaul link to the core network through the primary donor, and the member node establishes a backhaul link to the core network through the secondary donor and the primary donor.

29. A method for a backhaul network, wherein the backhaul network comprises a first communication apparatus connected to a core network and a plurality of second communication apparatuses performing wireless communication with the first communication apparatus, the method comprising causing at least one second communication apparatus of the plurality of second communication apparatuses to:

receive a second indication signal from a first communication apparatus that operates as a primary donor, the second indication signal including node type information indicating a member node; and in response to receiving the second indication signal, operate as a member node and connect to a second communication apparatus of the plurality of second communication devices that operates as a secondary donor, wherein the primary donor establishes a direct backhaul link with the core network, the secondary donor establishes a backhaul link to the core network through the primary donor, and the member node establishes a backhaul link to the core network through the secondary donor and the primary donor.

30. A method for a backhaul network, wherein the backhaul network comprises a first communication apparatus connected to a core network and a plurality of second communication apparatuses performing wireless communication with the first communication apparatus, the method comprising: causing the first communication apparatus to perform the method of Item 27, causing at least one second communication apparatus of the plurality of second communication apparatuses to perform the method of Item 28, and causing at least another second communication apparatus of the plurality of the second communication apparatuses to perform the method of Item 29.

31. A computer readable storage medium having stored thereon instructions that, when executed by a processor, cause the processor to perform the method of any of Items 27 to 29.

Furthermore, the aspects of any one or more of items 1 to 30 can be used in combination according to some embodiments of the present disclosure.

The invention claimed is:

1. An electronic device for a backhaul network, wherein the backhaul network comprises a first communication apparatus connected to a core network and a plurality of second communication apparatuses performing wireless communication with the first communication apparatus, the electronic device comprising:
processing circuitry configured to perform control to cause the first communication apparatus comprising the electronic device to:
operate as a primary donor;
select at least one second communication apparatus of the plurality of second communication apparatuses as a secondary donor;
transmit a first indication signal to the selected at least one second communication apparatus, the first indication signal comprising node type information indicating the secondary donor;
transmit a second indication signal to second communication apparatuses that are not selected, the second indication signal comprising node type information indicating a member node;
wherein the primary donor establishes a direct backhaul link to the core network, the secondary donor establishes a backhaul link to the core network through the primary donor, and the member node establishes a backhaul link to the core network through the secondary donor and the primary donor.

2. The electronic device according to claim 1, wherein selecting the at least one second communication apparatus of the plurality of second communication apparatuses as the secondary donor comprises: grouping the plurality of second communication apparatuses into at least one group, and selecting one second communication apparatus in each group as the secondary donor.

3. The electronic device according to claim 2, wherein selecting one second communication apparatus in each group as the secondary donor comprises one of:
selecting a second communication apparatus with the greatest reception power gain in the group as the secondary donor; or
selecting a second communication apparatus with a channel state that is closest to an average channel state of the group as the secondary donor.

4. The electronic device according to claim 1, wherein the processing circuitry is further configured to perform control to cause the first communication apparatus to:
assign an identifier of a first predefined set of identifiers to the secondary donor, and include the identifier assigned to the secondary donor in the first indication signal; and
assign an identifier of a second predefined set of identifiers to the member node, and include the identifier assigned to the member node in the second indication signal,
wherein the first predefined set of identifiers and the second predefined set of identifiers do not comprise a default identifier for the primary donor and do not comprise a common identifier.

5. The electronic device according to claim 1, wherein the processing circuitry is further configured to perform control to cause the first communication apparatus to:
transmit the second indication signal to a communication apparatus newly joined the backhaul network; and
transmit a third indication signal to the newly joined communication apparatus, wherein the third indication signal comprises an identifier for the secondary donor to which the newly joined communication apparatus is recommended to connect.

6. The electronic device according to claim 1, wherein the processing circuitry is further configured to perform control to cause the first communication apparatus to:
in response to receiving from member nodes a request for switching the secondary donor, select a new secondary donor from the member nodes that transmit the request, and transmit an acknowledgement for switching the secondary donor.

7. The electronic device according to claim 1, wherein the processing circuitry is further configured to perform control to cause the first communication apparatus to:
in response to receiving from member nodes a request for switching to be a direct node, transmitting to the member nodes that transmit the request an acknowledgement for switching to be a direct node, wherein the direct node establishes a backhaul link to the core network through the primary donor.

8. The electronic device according to claim 1, wherein the processing circuitry is further configured to perform control to cause the first communication apparatus to:
maintain a connection that is in an RRC_INACTIVE state with the member node.

9. The electronic device according to claim 1, wherein the first communication device and the plurality of second communication devices are base stations.

10. An electronic device for a backhaul network, wherein the backhaul network comprises a first communication apparatus connected to a core network and a plurality of second communication apparatuses performing wireless communication with the first communication apparatus, the electronic device comprising:

processing circuitry configured to perform control to cause a second communication apparatus of the plurality of second communication apparatuses comprising the electronic device to:
  receive a first indication signal from a first communication apparatus that operates as a primary donor, the first indication signal including node type information indicating a secondary donor;
  in response to receiving the first indication signal, operate as a secondary donor; and
  allow connection to a second communication apparatus of the plurality of second communication apparatuses that operates as a member node,
wherein the primary donor establishes a direct backhaul link to the core network, the secondary donor establishes a backhaul link to the core network through the primary donor, and the member node establishes a backhaul link to the core network through the secondary donor and the primary donor.

11. The electronic device according to claim 10, wherein, the first indication signal received from the primary donor further comprises an identifier assigned to the secondary donor, said identifier assigned to the secondary donor being in a first predefined set of identifiers which does not include a default identifier for the primary donor, and
the processing circuitry is further configured to perform control to cause the second communication apparatus including the electronic device to: broadcast a synchronization signal that corresponds to the identifier assigned to the secondary donor.

12. The electronic device according to claim 10, wherein the processing circuitry is further configured to perform control to cause the second communication apparatus comprising the electronic device to:
  when quality degradation of the backhaul link is detected, transmit to a member node that is connected to the secondary donor a request for switching a secondary donor;
  in response to receiving from the primary donor an acknowledgement for switching the secondary donor, switch from being the secondary donor to be a member node.

13. The electronic device according to claim 12, wherein switching from being the secondary donor to be a member node comprises: exchanging identifiers with a member node that is selected as the new secondary donor.

14. The electronic device according to claim 10, wherein the first communication apparatus and the plurality of second communication apparatuses are base stations.

15. An electronic device for a backhaul network, wherein the backhaul network comprises a first communication apparatus connected to a core network and a plurality of second communication apparatuses performing wireless communication with the first communication apparatus, the electronic device comprising:
  processing circuitry configured to perform control to cause the second communication apparatus including the electronic device to:
    receive a second indication signal from a first communication apparatus that operates as a primary donor, the second indication signal including node type information indicating a member node; and
    in response to receiving the second indication signal, operate as a member node and connect to a second communication apparatus of the plurality of second communication devices that operates as a secondary donor,
wherein the primary donor establishes a direct backhaul link with the core network, the secondary donor establishes a backhaul link to the core network through the primary donor, and the member node establishes a backhaul link to the core network through the secondary donor and the primary donor.

16. The electronic device according to claim 15, wherein, the second indication signal received from the primary donor includes an identifier of a secondary donor to which the member node is to be connected, and
the secondary donor having the identifier is connected.

17. The electronic device according to claim 15, wherein the processing circuitry is further configured to perform control to cause the second communications apparatus comprising the electronic device to:
  detect a synchronization signal that corresponds to an identifier in a first predefined set of identifiers; and
  connect to the secondary donor that transmits the synchronization signal.

18. The electronic device according to claim 15, wherein the processing circuitry is further configured to perform control to cause the second communication apparatus comprising the electronic device to:
  in response to receiving from a secondary donor to which the member node is connected a request for switching the secondary donor, transmit to the primary donor a request for switching the secondary donor;
  in response to receiving from the primary donor an acknowledgement for switching the secondary donor, perform one of:
  exchanging identifiers with the secondary donor to which it is connected and switching from being the member node to be a new secondary donor, and
  connecting to a new secondary donor.

19. The electronic device according to claim 15, wherein the processing circuitry is further configured to perform control to cause the second communication apparatus comprising the electronic device to:
  when quality degradation of the backhaul link is detected, send to the primary donor a request for switching to be a direct node;
  in response to receiving from the primary donor an acknowledgement for switching to be a direct node, switch from being the member node to be the direct node, wherein the direct node establishes a backhaul link to the core network through the primary donor.

20. The electronic device according to claim 15, wherein the processing circuitry is further configured to perform control to cause the second communication apparatus comprising the electronic device to:
  when operating as the member node, maintain a connection that is in an RRC_INACTIVE state with the primary donor.

* * * * *